US011369542B2

(12) United States Patent
Lee et al.

(10) Patent No.: US 11,369,542 B2
(45) Date of Patent: Jun. 28, 2022

(54) MOTION ASSISTANCE APPARATUS

(71) Applicant: Samsung Electronics Co., Ltd., Suwon-si (KR)

(72) Inventors: Minhyung Lee, Seoul (KR); Jeonghun Kim, Suwon-si (KR); Se-Gon Roh, Suwon-si (KR); Youn Baek Lee, Yongin-si (KR); Jongwon Lee, Suwon-si (KR); Byungjune Choi, Gunpo-si (KR); Hyun Do Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1124 days.

(21) Appl. No.: 15/475,759

(22) Filed: Mar. 31, 2017

(65) Prior Publication Data

US 2018/0147108 A1 May 31, 2018

(30) Foreign Application Priority Data

Nov. 29, 2016 (KR) .................. 10-2016-0160846

(51) Int. Cl.
*A61H 3/00* (2006.01)
*A61H 1/02* (2006.01)
(Continued)

(52) U.S. Cl.
CPC .............. *A61H 3/00* (2013.01); *A61H 1/0244* (2013.01); *A61H 1/0281* (2013.01);
(Continued)

(58) Field of Classification Search
CPC . A61F 2005/0155; A61H 3/00; A61H 3/2201; A61H 3/149; A61H 2201/1628;
(Continued)

(56) References Cited

U.S. PATENT DOCUMENTS

| 6,039,707 A | 3/2000 | Crawford et al. |
| 7,429,253 B2 | 9/2008 | Shimada et al. |

(Continued)

FOREIGN PATENT DOCUMENTS

| CN | 101589983 A | 12/2009 |
| CN | 104546387 A | 4/2015 |

(Continued)

OTHER PUBLICATIONS

Extended European Search Report issued by the European Patent Office dated Nov. 17, 2017 for the corresponding EP Patent Application No. 17169979.6.

(Continued)

*Primary Examiner* — Christopher D. Prone
(74) *Attorney, Agent, or Firm* — Harness, Dickey & Pierce, P.L.C.

(57) ABSTRACT

A motion assistance apparatus including a first support configured to support a waist of a user, a side frame connected to the first support and configured to cover at least a portion of a side of the waist, and a joint assembly connected to the side frame such that a location of the joint assembly is adjustable in a longitudinal direction of the side frame, and configured to be located at a part of a hip joint of the user is disclosed.

16 Claims, 22 Drawing Sheets

(51) Int. Cl.
*B25J 9/00* (2006.01)
*A63B 21/00* (2006.01)
*A63B 22/00* (2006.01)
*A63B 23/04* (2006.01)
*A63B 21/068* (2006.01)
*A63B 21/005* (2006.01)
*A63B 21/04* (2006.01)
*A63B 21/055* (2006.01)
*A63B 21/02* (2006.01)

(52) U.S. Cl.
CPC ............ *B25J 9/0006* (2013.01); *A61H 1/024* (2013.01); *A61H 1/0277* (2013.01); *A61H 1/0285* (2013.01); *A61H 2201/1215* (2013.01); *A61H 2201/149* (2013.01); *A61H 2201/165* (2013.01); *A61H 2201/1614* (2013.01); *A61H 2201/1628* (2013.01); *A61H 2201/1676* (2013.01); *A61H 2203/03* (2013.01); *A61H 2205/062* (2013.01); *A61H 2205/088* (2013.01); *A63B 21/0004* (2013.01); *A63B 21/0058* (2013.01); *A63B 21/00178* (2013.01); *A63B 21/00181* (2013.01); *A63B 21/023* (2013.01); *A63B 21/0421* (2013.01); *A63B 21/055* (2013.01); *A63B 21/068* (2013.01); *A63B 21/4009* (2015.10); *A63B 21/4011* (2015.10); *A63B 21/4025* (2015.10); *A63B 23/0482* (2013.01); *A63B 2022/0094* (2013.01)

(58) Field of Classification Search
CPC .............. A61H 2205/088; A61H 3/088; A61H 2201/149; B25J 9/0006
See application file for complete search history.

(56) References Cited

U.S. PATENT DOCUMENTS

| | | | |
|---|---|---|---|
| 2007/0106190 | A1 | 5/2007 | Katoh et al. |
| 2008/0154165 | A1* | 6/2008 | Ashihara ............... A61H 1/0255 602/23 |
| 2011/0160626 | A1* | 6/2011 | Takahashi ................ A61H 3/00 601/34 |
| 2015/0005686 | A1* | 1/2015 | Kazerounian ......... A61F 5/0123 602/16 |
| 2015/0272810 | A1 | 10/2015 | Teng et al. |
| 2015/0366740 | A1 | 12/2015 | Endo |

FOREIGN PATENT DOCUMENTS

| | | | |
|---|---|---|---|
| CN | 105726267 A | 7/2016 | |
| CN | 106073956 A | 11/2016 | |
| EP | 3 087 967 A1 | 11/2016 | |
| EP | 3087967 A1 * | 11/2016 | ........... A61H 1/0244 |
| JP | 2009-178253 A | 8/2009 | |
| JP | 2010000204 A | 1/2010 | |
| JP | 2013-208290 A | 10/2013 | |
| KR | 100731899 B1 | 6/2007 | |
| KR | 101142240 B1 | 5/2012 | |
| KR | 101233649 B1 | 2/2013 | |
| KR | 2015-0077439 A | 7/2015 | |
| WO | WO-2014/092162 A1 | 6/2014 | |
| WO | WO-2015/006853 A1 | 1/2015 | |
| WO | WO-2016/180073 A | 11/2016 | |

OTHER PUBLICATIONS

First Office Action dated May 28, 2020 for the corresponding Chinese Application No. 201710399974.5.

* cited by examiner

MOTION ASSISTANCE APPARATUS

CROSS-REFERENCE TO RELATED APPLICATION

This application claims under 35 U.S.C. § 119 to Korean Patent Application No. 10-2016-0160846 filed on Nov. 29, 2016 in the Korean Intellectual Property Office, the entire contents of which are incorporated herein by reference in its entirety.

BACKGROUND

1. Field

At least one example embodiment relates to a motion assistance apparatus.

2. Description of the Related Art

Motion assistance apparatuses enabling the elderly and/or patients having joint problems to walk with less effort have been developed. The motion assistance apparatuses increasing muscular strength of human bodies are also desired for military purposes.

SUMMARY

Some example embodiments relate to a motion assistance apparatus.

In some example embodiments, the motion assistance apparatus may include a first support configured to support a waist of a user; a side frame connected to the first support, the side frame configured to cover at least a portion of a side of the waist; and a joint assembly configured to move in a longitudinal direction of the side frame to locate the joint assembly at a part of a hip joint of the user.

In some example embodiments, the joint assembly is slidably connected to the side frame, and an angle of a sliding direction of the joint assembly is in a range between 50 degrees (°) and 70° relative to a ground when the user is in an upright state.

In some example embodiments, the side frame is configured to rotate relative to the first support based on a first rotational axis vertical to a virtual straight line, the virtual straight line being parallel with a joint rotation axis of the joint assembly.

In some example embodiments, the motion assistance apparatus is configured to adjust the joint rotation axis by sliding the joint assembly on the side frame such that the joint rotation axis and the first rotational axis have a single intersection point.

In some example embodiments, the motion assistance apparatus is configured to adjust the first rotational axis such that the first rotational axis intersects with a straight line vertically connecting the hip joint and a ground when the user is in an upright state.

In some example embodiments, the side frame is configured to slide in a horizontal direction of the user relative to the first support to adjust the first rotational axis.

In some example embodiments, the motion assistance apparatus is configured to adjust the joint rotation axis and the first rotational axis such that the single intersection point is positioned at a hip joint when the user is in an upright state.

In some example embodiments, the first support includes a support plate configured to support a rear side of the waist of the user; and a base plate connected to the side frame, the base plate configured to pivot with respect to the support plate to adjust the first rotational axis.

In some example embodiments, the motion assistance apparatus may include a rotation assembly configured to rotate the side frame relative to the first support.

In some example embodiments, the rotation assembly includes an actuator configured to provide a rotational power to rotate the side frame relative to the first support, the actuator being one of a motor and an elastic body.

In some example embodiments, the actuator is an elastic body having a first end a second end, the first end of the elastic body being connected to the side frame and the second end of the elastic body being connected to the first support.

Some other example embodiments also relate to a motion assistance apparatus.

In some example embodiments, the motion assistance apparatus may include a first support configured to support a first part of a user; a side frame configured to cover at least a portion of a side of the user; and a joint assembly connected to the side frame, the joint assembly configured to adjust a location of the joint assembly in a longitudinal direction of the side frame.

In some example embodiments, the joint assembly is configured to slide in a sliding direction, the sliding direction being in the longitudinal direction of the side frame.

In some example embodiments, the motion assistance apparatus is configured to adjust an angle of the sliding direction of the joint assembly.

In some example embodiments, the side frame is configured to rotate based on an axis vertical to a virtual straight line, the virtual straight line being parallel with the sliding direction of the joint assembly.

In some example embodiments, the side frame includes a rotary link connected to the first support, the rotary link configured to rotate based on a first rotational axis that passes through the first support; and a side link connected to the rotary link, the side link configured to rotate about based on a second rotational axis located on a plane perpendicular to the first rotational axis.

In some example embodiments, the first rotational axis is orthogonal to the second rotational axis.

In some example embodiments, the motion assistance apparatus may further include a stopper configured to set a rotation angle of the side link relative to the rotary link.

In some example embodiments, the side frame is slidably connected to the first support to adjust a location of the side frame relative to the first support.

In some example embodiments, the first support may include a base plate configured to support the first part of the user; a guide rail provided on the base plate; and a guide member configured to connect to the side frame, and to slide along the guide rail to adjust the location of the side frame relative to the first support.

In some example embodiments, the joint assembly is configured to rotate based on a joint rotation axis, the side frame is configured to rotate based on a first rotational axis that passes through the first support, and the motion assistance apparatus is configured to adjust the joint rotation axis and the first rotational axis such that the first rotational axis and the joint rotation axis have a single intersection point.

In some example embodiments, the motion assistance apparatus may further include a second support configured to support a second part of the user; and a force transmitter configured to connect the joint assembly and the second support, wherein the single intersection point is at a joint connecting the first part of the user and the second part of the user.

In some example embodiments, the first support further includes a support plate between the first part of the user and the base plate, and the base plate is connected to the support plate, the base plate configured to pivot with respect to the support plate to adjust an angle between the base plate and the support plate.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1A:
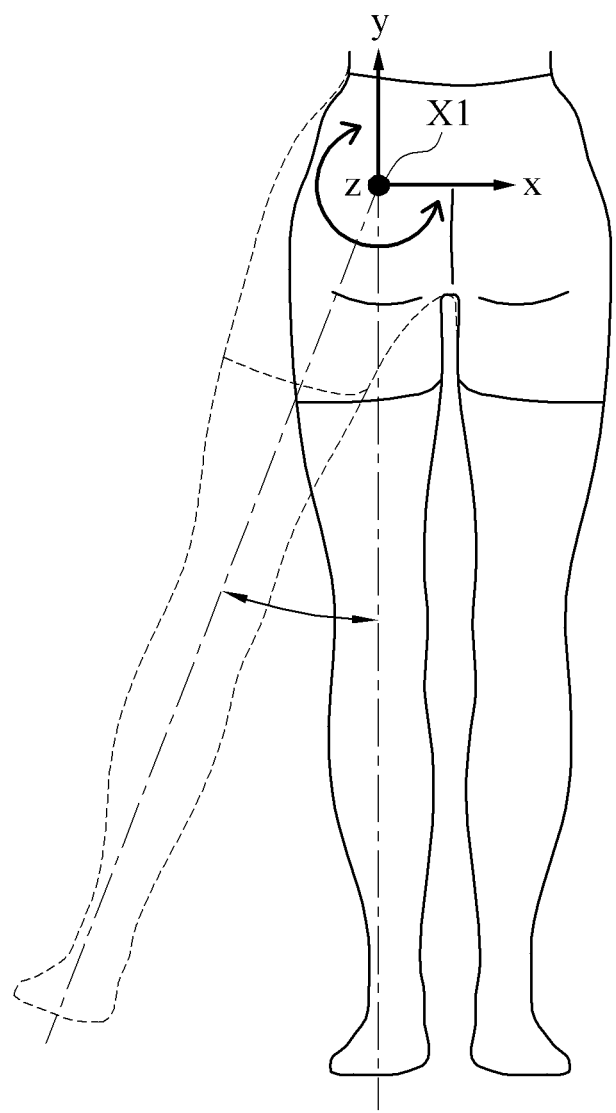
FIGS. 1A through 1C illustrate examples of a movement of a hip joint of a user.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 1B:
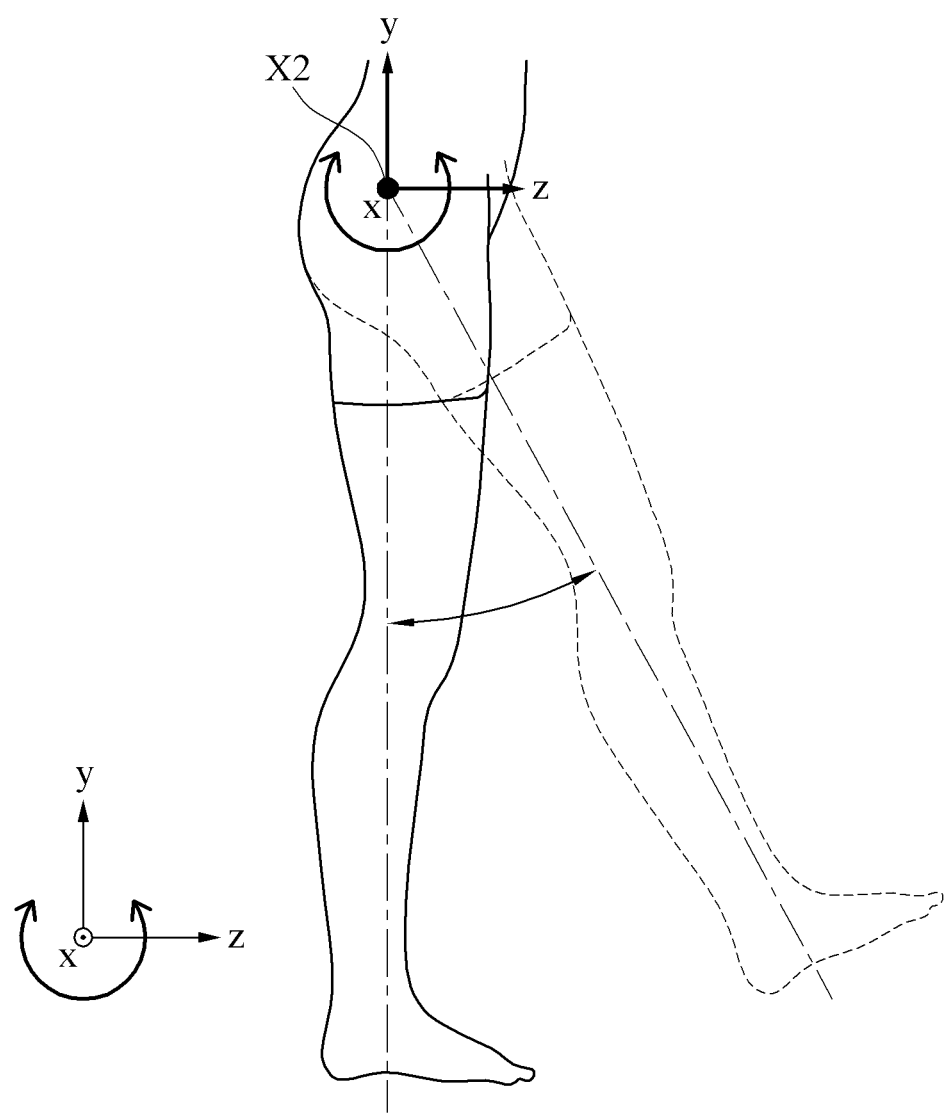
Figure 1C:
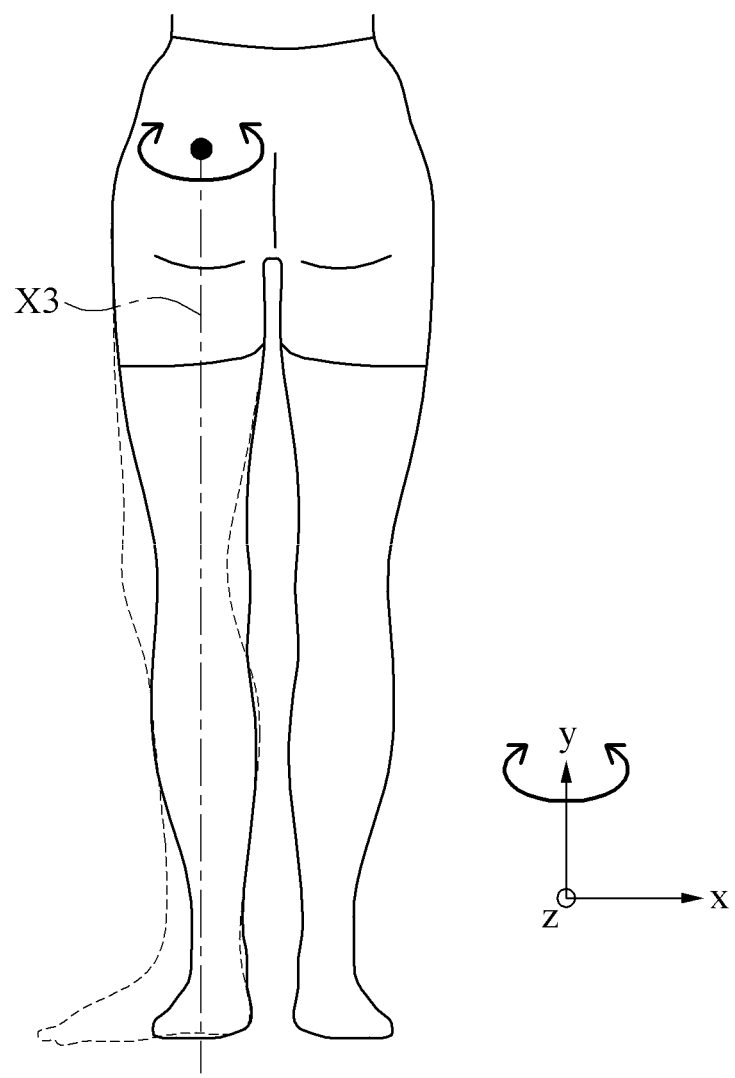

FIGS. 1A through 1C illustrate examples of a movement of a hip joint of a user. FIG. 1A illustrates an adduction/abduction motion of a hip joint of a user, FIG. 1B illustrates an extension/flexion motion of the hip joint of the user, and FIG. 1C illustrates a medial rotation/lateral rotation motion of the hip joint of the user.

Referring to FIGS. 1A through 1C, the hip joint of the user may be understood as a ball joint capable of three-degree-of-freedom rotational motion. Through the three-degree-of-freedom rotational motion of the hip joint, the user may move a thigh relative to a waist. An axis X1, an axis X2, and an axis X3 may be rotational axes respectively for the adduction/abduction motion, the extension/flexion motion, and the medial rotation/lateral rotation motion of the hip joint of the user being in an upright state. Hereinafter, the axis X1, the axis X2, and the axis X3 may also be referred to as an adduction/abduction axis X1, an extension/flexion axis X2, and a medial rotation/lateral rotation axis X3, respectively. Three rotary motions of the hip joint may occur simultaneously. For example, the hip joint may make a circumduction motion in which adduction/abduction and extension/flexion occur simultaneously. When the hip joint rotates based on one of the axes X1, X2, and X3, locations or angles of remaining axes may vary. Thus, to appropriately assist a motion of the hip joint of the user, it may be desirable to change a location or an angle of each of the axes X1, X2, and X3 in response to the circumduction motion.

Figure 2:
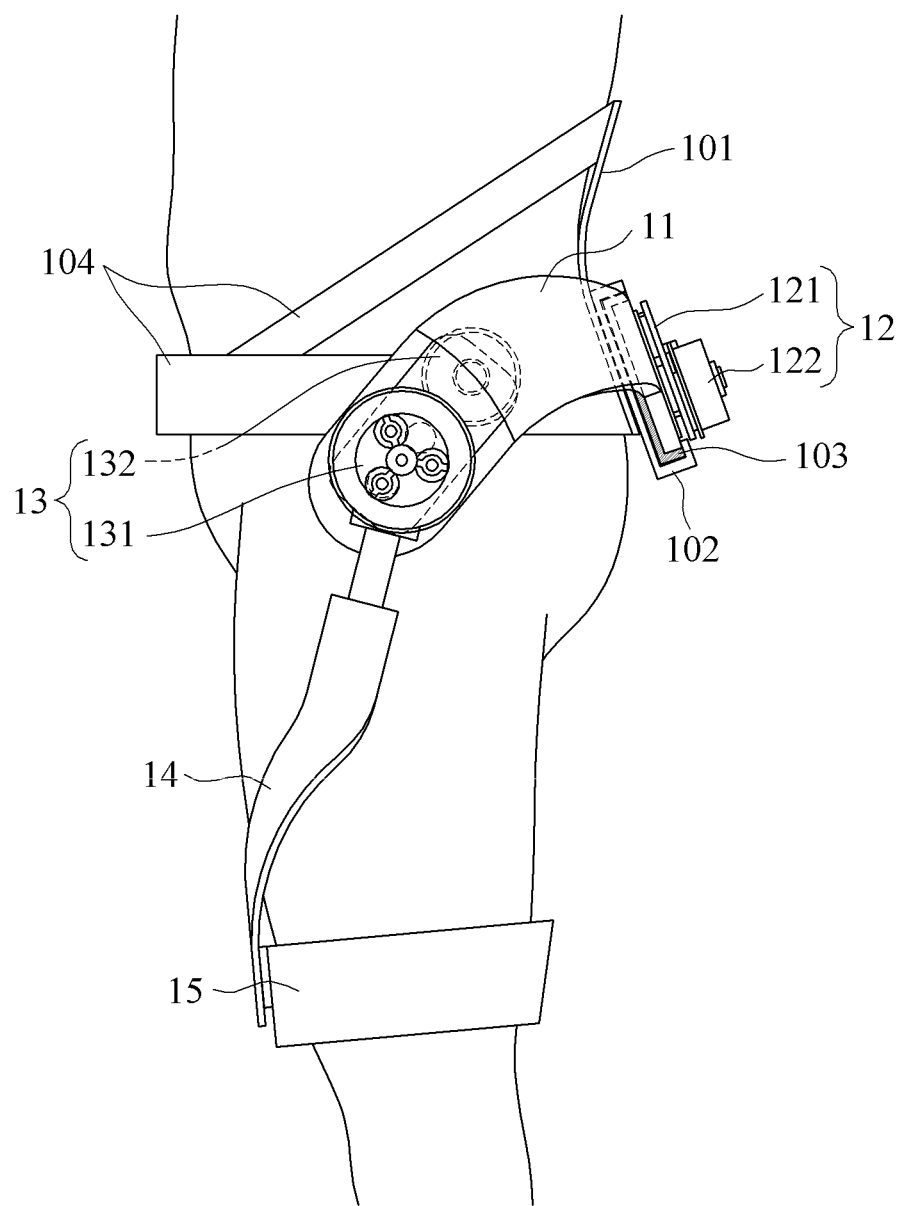
FIG. 2 is a side view illustrating an example of a user wearing a motion assistance apparatus.
Figure 3:
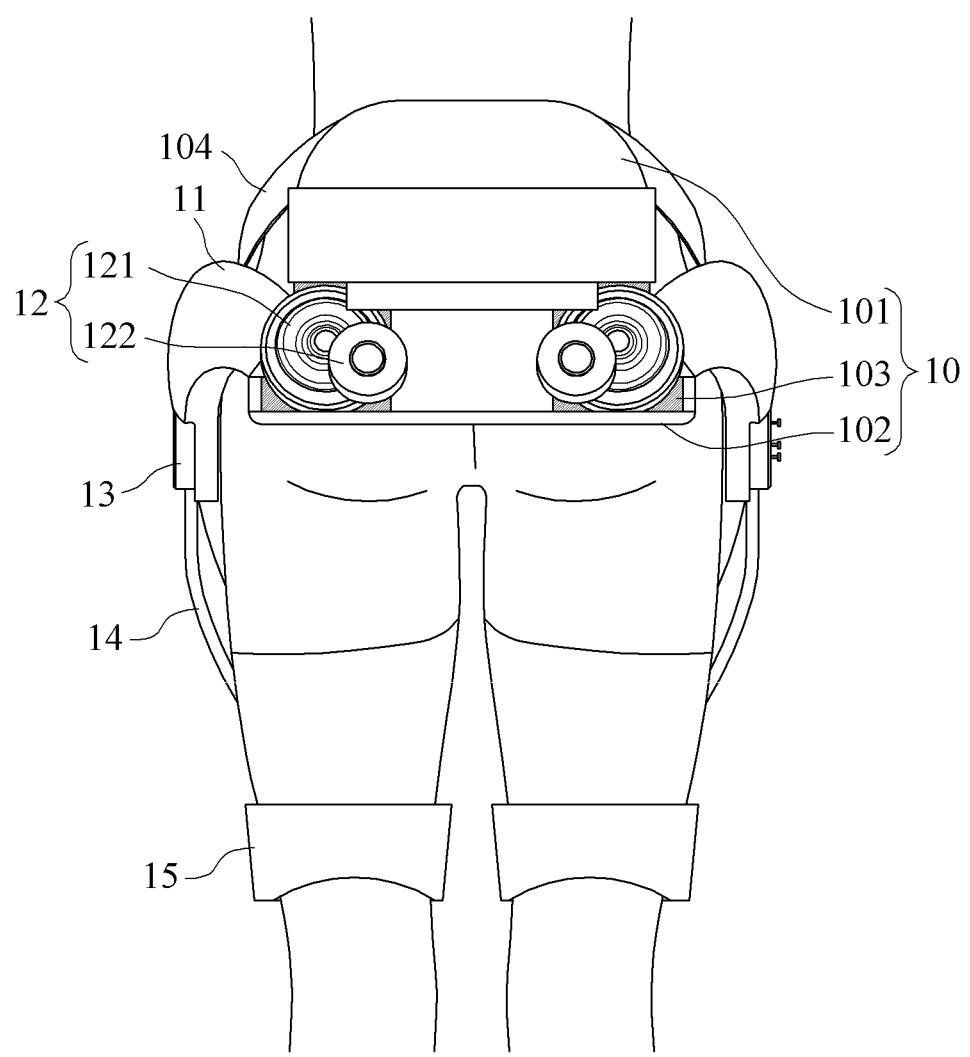
FIG. 3 is a rear view illustrating an example of a user wearing a motion assistance apparatus.

FIG. 2 is a side view illustrating an example of a user wearing a motion assistance apparatus and FIG. 3 is a rear view illustrating an example of a user wearing a motion assistance apparatus.

Referring to FIGS. 2 and 3, a motion assistance apparatus 1 may be worn by a user in order to assist a motion of the user. The user may be a human, an animal, a robot or any other moving structure or being. However, example embodiments are not limited thereto. Further, although FIGS. 1 and 2 illustrate examples in which the motion assistance apparatus 1 assists a motion of a hip joint of the user, the motion assistance apparatus 1 may also assist a motion of another part of an upper body, for example, a wrist, an elbow, and a shoulder of the user, or a motion of another part of a lower body, for example, an ankle or a knee of the user. The motion assistance apparatus 1 may assist a motion of a part of the user. Hereinafter, a case in which the motion assistance apparatus 1 assists a motion of a hip joint of a human will be described as an example.

The motion assistance apparatus 1 may include a first support 10, a side frame 11, a rotation assembly 12, a joint assembly 13, a force transmitter 14, and a second support 15.

The first support 10 may support a first part of the user. The first part may be a proximal part relatively close to a center of a body based on the hip joint of the user, for example, a waist of the user. The first support 10 may include a base plate 101, a guide rail 102, a guide member 103, and an attaching member 104.

The base plate 101 may be located on the first part, for example, a rear side of the waist of the user. For example, the base plate 101 may be formed to include a curved surface corresponding to the rear side of the waist. Through this, the base plate 101 may be in close contact with the rear side of the waist and thus, a user inconvenience following a body motion may be reduced.

The guide member 103 may be configured to connect the side frame 11 and the first support 10, and connected to the base plate 101 such that a location of the guide member 103 is adjustable. The guide member 103 may slide along the guide rail 102 formed in a lateral direction of the base plate 101. The guide member 103 may be attached to a desired (or, alternatively, a predetermined) position on the guide rail 102 using a fixer such as a screw and the like, for example. Based on such structure, a location of the side frame 11 may be adjusted relative to the first support 10. For example, the side frame 11 may slide in a horizontal direction of the user with respect to the first support 10. In response to a movement of the guide member 103, a distance by which the side frame 11 is spaced apart from a center of the base plate 101 may be adjusted. Thus, the motion assistance apparatus 1 may be used irrespective of body shapes of users.

The attaching member 104 may be connected to the base plate 101, and configured to attach the base plate 101 to the first part of the user. As illustrated in FIG. 2, the attaching member 104 may be a detachable belt that fully covers the waist of the user.

The side frame 11 may be connected to the first support 10, and formed to cover at least a portion of a lateral side of a body, for example, a lateral side of the waist of the user. The side frame 11 may be provided on both sides of the user as illustrated in FIGS. 2 and 3, and the side frame 11 may also be provided on one side of the user. The side frame 11 may be located on a side face of a joint, for example, the hip joint of the user. As illustrated in FIG. 2, from a perspective of the lateral side of the user, the side frame 11 may have a longitudinal direction in which the side frame 11 is inclined downward to the ground when the user is in an upright state. For example, the side frame 11 may be curved from the rear side of the waist toward the lateral side of the waist. Also, the side frame 11 may extend to cover a hip joint part of the user.

The rotation assembly 12 may assist, for example, an adduction/abduction motion of the hip joint. The rotation assembly 12 may rotate the side frame 11 relative to the first support 10. The rotation assembly 12 may be located at, for example, an upper portion of a hip of the user. The rotation assembly 12 may include a rotation member 121 and an actuator 122.

The rotation member 121 may connect the side frame 11 and the first support 10. For example, the rotation member 121 may be attached to one side of the side frame 11 and rotatably provided in the guide member 103. In such structure, the side frame 11 may rotate based on a first rotational axis A1 passing through the base plate 101 with respect to the first support 10. Here, the first rotational axis A1 is understood as vertical to a virtual straight line parallel with a joint rotation axis J of the joint assembly 13. The first rotational axis A1 and the joint rotation axis J will also be described with reference to FIG. 5.

Figure 5:
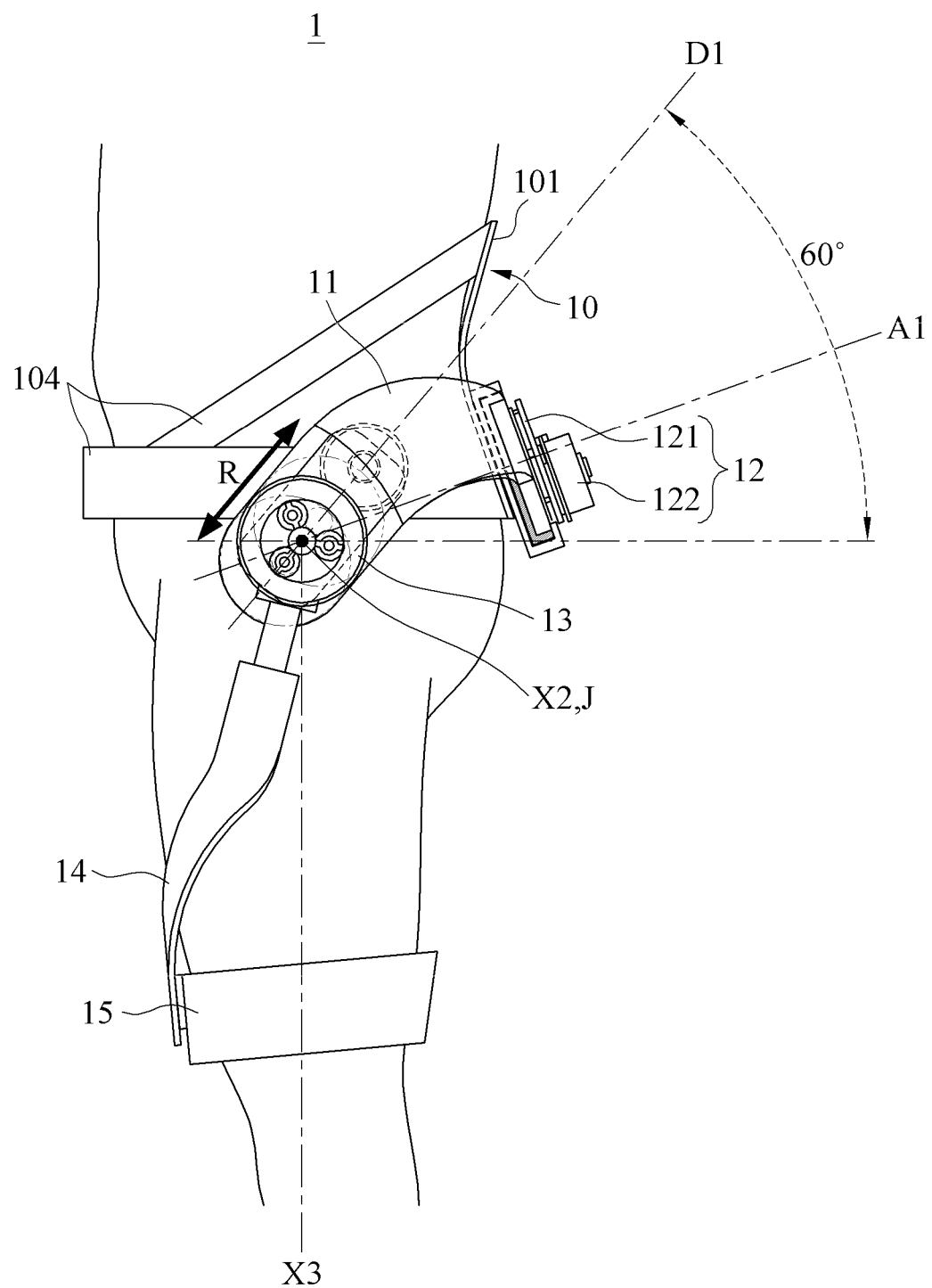
FIG. 5 illustrates an example of adjusting a location of a joint rotation axis.

For example, as illustrated in FIG. 5, the first rotational axis A1 may be provided in an ascending direction from the hip joint toward the rear. Based on such structure, the side frame 11 may make a motion similar to the adduction/abduction motion of the hip joint of the user.

The actuator 122 may provide a power for rotating the rotation member 121. Through this, the actuator 122 may provide the torque to the side frame 11 such that the side frame 11 is to be rotatable based on the first rotational axis A1. The actuator 122 may be, for example, a motor configured to actively provide the power to the rotation member 121 as illustrated in FIGS. 2 and 3. The actuator 122 may also be an elastic body configured to passively provide the power to the rotation member 121 based on a potential energy. For example, in response to a phenomenon that a center of weight is biased to one leg in contact with the ground while the user is walking, the actuator 122 may provide an appropriate assisting force in a direction in which the one leg makes the adduction/abduction motion.

The joint assembly 13 may assist the extension/flexion motion of the hip joint. The joint assembly 13 may be connected to the side frame 11 such that a location of the joint assembly 13 is adjustable in a longitudinal direction of the side frame 11. For example, the joint assembly 13 may slide in the longitudinal direction of the side frame 11. The joint assembly 13 may move to a location corresponding to a joint of the user. As illustrated in FIG. 2, the joint assembly 13 may be located in the hip joint part of the user while moving in the longitudinal direction of the side frame 11 disposed on the lateral side of the user.

The joint assembly 13 may include a rotary body 131 and a driving source 132 configured to provide a power to the rotary body 131.

The rotary body 131 may receive the power from the driving source 132 and rotate the force transmitter 14 while rotating based on the joint rotation axis J passing through the side frame 11. When the joint assembly 13 is located on the lateral side of the user, the rotary body 131 may rotate similarly to the extension/flexion motion of the hip joint of the user. The rotary body 131 may have, for example, a planetary gear structure including a sun gear, a planetary gear, and a ring gear. Through this, the rotary body 131 may achieve a high reduction gear ratio in a small space.

The driving source 132 may slide in the longitudinal direction of the side frame 11 along with the rotary body 131. In this example, in comparison to a case in which the rotary body 131 receives the power from an external driving source, a stable and constant power may be delivered from the driving source 132 to the rotary body 131 without need to use a tensioner included in a power transmitting member connecting the rotary body 131 and the external driving source in order to maintain a constant tension.

The second support 15 may support a second part of the user. The second part may be a distal part farther than the hip joint from a center of the body, for example, a thigh of the user. For example, the second support 15 may be disposed opposite to the first support 10 based on a joint of the user to be assisted by the motion assistance apparatus 1. The second support 15 may receive a torque generated in the joint assembly 13 and/or the rotation assembly 12 through the force transmitter 14 and move the second part of the user.

The force transmitter 14 may be a longitudinal member extending from the joint assembly 13 to the second support 15. The longitudinal member may be, for example, a frame as illustrated in FIG. 1, or a member such as a wire and a rubber string.

Figure 4:
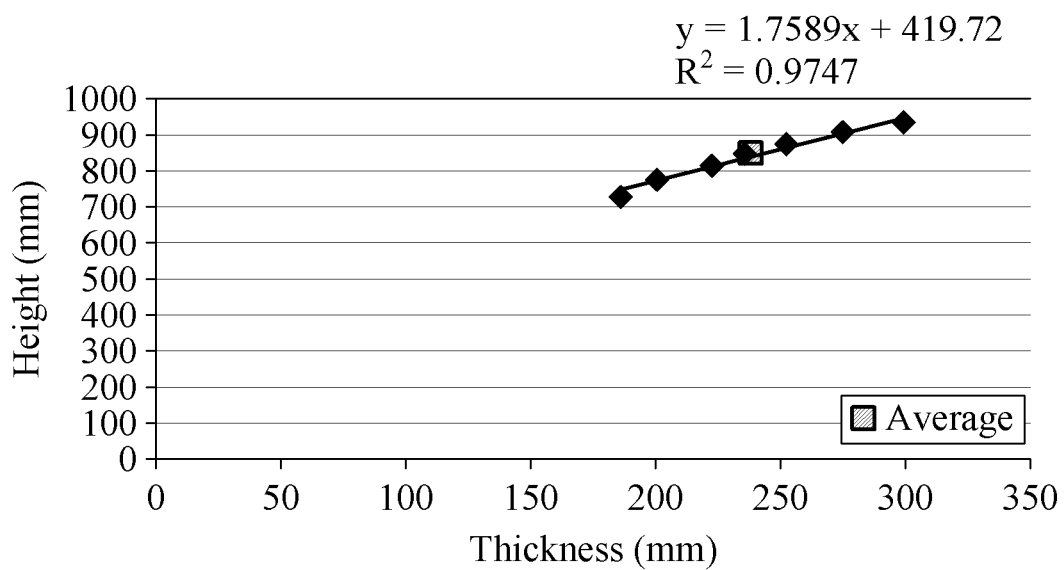
FIG. 4 illustrates an example of a hip joint position distribution based on research on a body size.

FIG. 4 illustrates an example of a hip joint position distribution based on research on a body size.

Referring to FIG. 4, FIG. 4 illustrates a graph representing data derived from the sixth human body size survey of Size Korea under the National Institute of Standards and Technology of Korea. In the graph of FIG. 4, a horizontal axis represents a hip thickness of a user and a vertical axis represents a height of a hip joint measured from the ground when a user is in an upright state. From the graph, it can be known that positions of hip joints of Korean males aged 35 to 49 years are distributed on a line with a gradient of about 1.7589. The gradient of the line may be calculated as about)tan(60° and thus, an angle between the line and the ground may be about 60°.

As a result, positions of hip joints of users may be distributed on a line having a set (or, alternatively, a predetermined) gradient relative to the ground. The result may be similarly applied to other groups. For example, a distribution of positions of hip joints of users may follow a line with a set (or, alternatively, a predetermined) gradient relative to the ground in a range set based on conditions such as a race, a country, a gender, and the like, which may be empirically determined through study. The result may also be applied to a joint assistance mechanism of a motion assistance apparatus.

As described with reference to FIGS. 2 and 3, a location of the joint assembly 13 may be adjusted in a direction diagonal to the ground when the user is in the upright state. Thus, the joint rotation axis J of the joint assembly 13 may be matched to the extension/flexion axis X2 by setting the direction in which the location of the joint assembly 13 is adjusted to be a desired (or, alternatively, a predetermined) angle, for example, 60°. However, example embodiments are not limited thereto.

Figure 6:
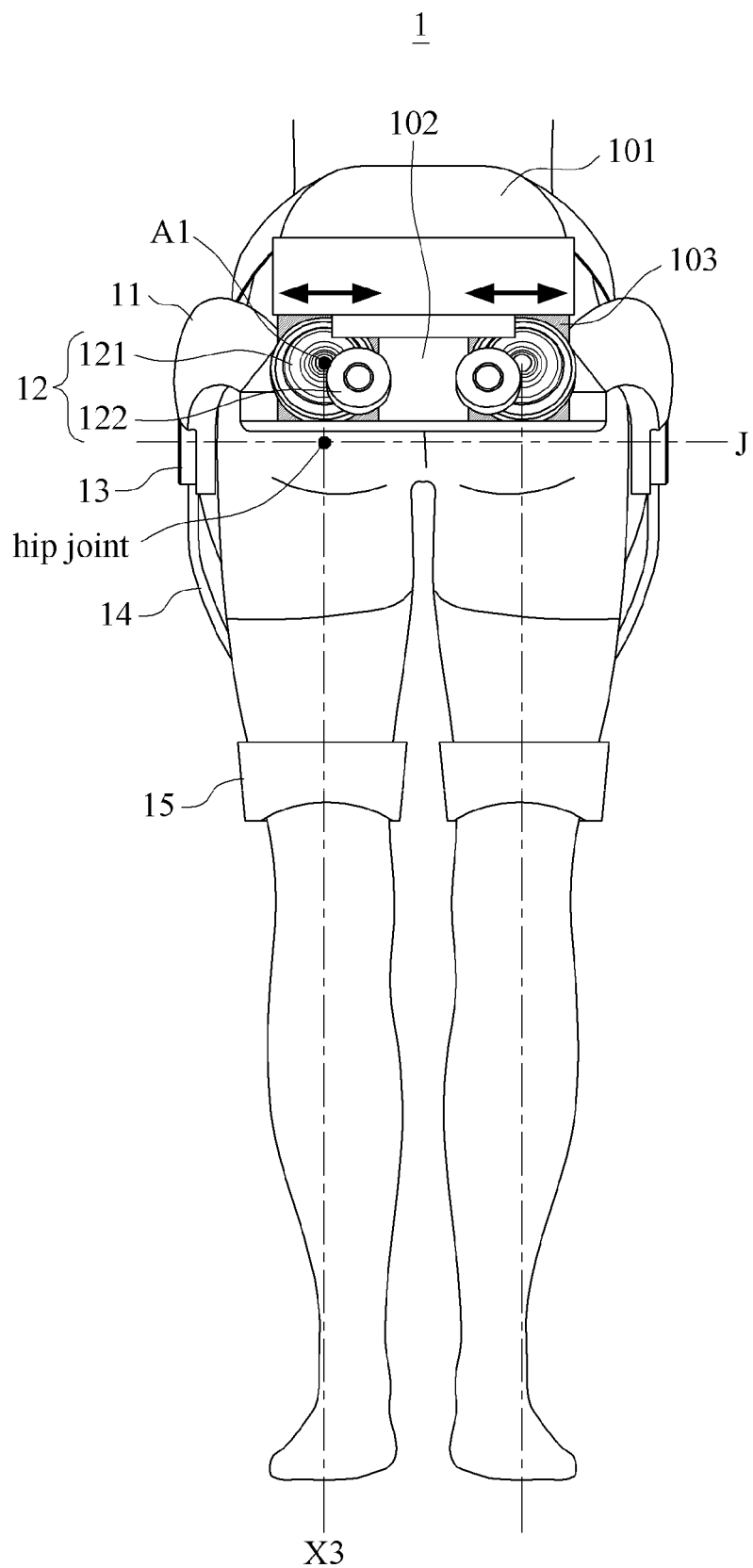
FIG. 6 illustrates an example of adjusting a location of a first rotational axis.

FIG. 5 illustrates an example of adjusting a location of a joint rotation axis, FIG. 6 illustrates an example of adjusting a location of a first rotational axis.

Referring to FIG. 5, a location of the joint rotation axis J may be adjusted in a longitudinal direction of the side frame 11. The joint assembly 13 may slide in the longitudinal direction of the side frame 11. In this example, a sliding direction of the joint assembly 13 may be vertical to the extension/flexion axis X2 of a hip joint when a user is in an upright state. The joint rotation axis J may be parallel with the extension/flexion axis X2 of the hip joint. The joint assembly 13 may slide ascendingly relative to the ground in a direction from front to rear of the user when the user is in the upright state. Based on the body size data of FIG. 4, the side frame 11 that determines the sliding direction of the joint assembly 13 may overlap the hip joint of the user and have a longitudinal direction inclined at an angle between 50° and 70° relative to the ground when viewed from a side of the user.

The joint rotation axis J may be adjusted to pass through the hip joint of the user. The location of the joint assembly 13 may be adjusted such that the joint rotation axis J passes through the hip joint of the user. When the location of the joint assembly 13 is adjusted, the joint assembly 13 may effectively assist a motion, for example, an extension/flexion motion of the hip joint during a gait of the user. As illustrated in FIG. 5, when the joint rotation axis J matches the extension/flexion axis X2 of the hip joint, the joint assembly 13 may rotate at an angle the same as an angle of the extension/flexion motion of the hip joint. Through this, consumption of a torque provided from the joint assembly 13 and the rotation assembly 12 to the hip joint may be reduced (or, alternatively, minimized). Also, the motion assistance apparatus 1 may be less likely to be (or, alternatively, prevented from being) twisted due to non-matched axes and a user wearability may be improved.

Referring to FIG. 6, a location of the first rotational axis A1 may be adjusted relative to the first support 10. The side frame 11 may slide in a horizontal direction of the user with respect to the first support 10. The first rotational axis A1 may slide in a direction parallel to the joint rotation axis J.

The first rotational axis A1 may be adjusted to pass through the hip joint of the user irrespective of a waist size of the user. The location of the rotation assembly 12 may be adjusted such that the first rotational axis A1 passes through the hip joint of the user. When the location of the rotation assembly 12 is adjusted, the rotation assembly 12 may effectively assist the adduction/abduction motion of the user.

As further discussed above, the joint assembly 13 may move in the longitudinal direction of the side frame 11 such that the joint rotation axis J is adjusted to pass through the hip joint of the user. Also the side frame 11 may move in the horizontal direction relative to the first support 10 such that the first rotational axis A1 is adjusted to pass through the hip joint. The first rotational axis A1 may be adjusted to intersect the medial rotation/lateral rotation axis X3 that is a straight line vertically connecting the hip joint and the ground when the user is in the upright state.

In some example embodiments, the joint assembly 13 may be configured to continually slide along the side frame 11 to adjust a location of the joint rotation axis J as the user walks. In other example embodiments, the motion assistance apparatus 1 may include a first locking device to lock the joint assembly 13 at a position along the side frame 11 once the joint rotation axis J is aligned with the hip joint of the user. Likewise, in some example embodiments, the side frame 11 may be configured to continually slide along the first support 10 to adjust the first rotational axis A1 to pass through the hip joint and intersect with the medial rotation/lateral rotation axis X3. In other example embodiments, the motion assistance apparatus 1 may include a second locking device to lock the side frame 11 at a position along the first support 10 once the first rotational axis A1 passes through the hip joint and intersects the medial rotation/lateral rotation axis X3.

Figure 7:
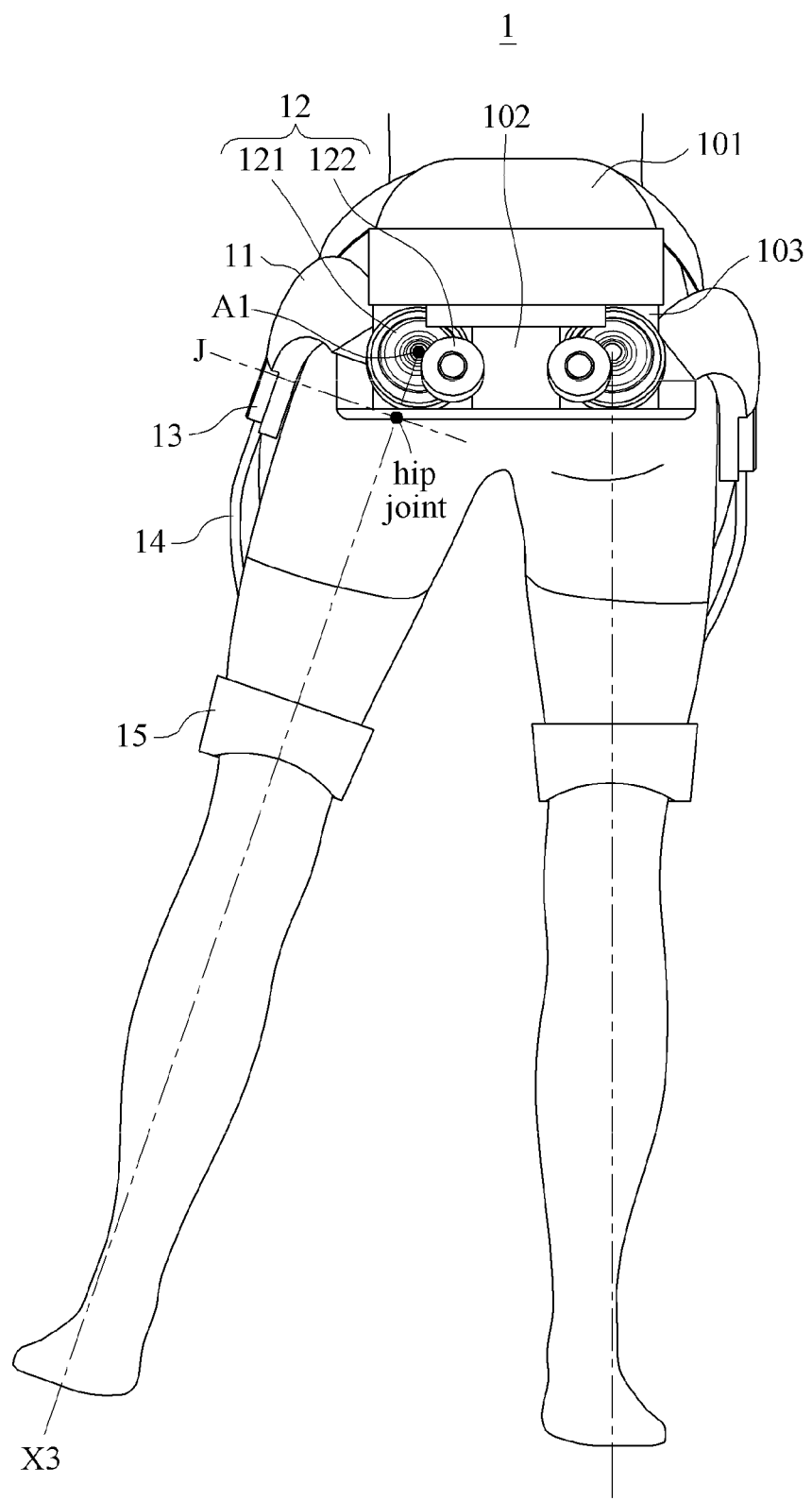
FIG. 7 illustrates an example of a motion assistance apparatus assisting a motion of a hip joint of a user.

FIG. 7 illustrates an example of a motion assistance apparatus assisting a motion of a hip joint of a user.

Referring to FIG. 7, the joint assembly 13 and the rotation assembly 12 may assist an extension/flexion motion and an adduction/abduction motion of a hip joint, respectively. The second support 15 may have two degree of freedom based on the joint rotation axis J and the first rotational axis A1. The motion assistance apparatus 1 may enable a user to move naturally while assisting a gait of the user. In an example of FIG. 7, the extension/flexion motion, the adduction/abduction motion, and a medial rotation/lateral rotation motion may simultaneously occur in the hip joint while the user is walking. When the joint rotation axis J and the first rotational axis A1 are adjusted to pass through the hip joint of the user, the motion assistance apparatus 1 operating based on the joint rotation axis J and the first rotational axis A1 may be less likely to interfere (or, alternatively, prevented from interfering) with the medial rotation/lateral rotation motion of the hip joint. When the second support 15 is configured to cover a thigh of the user, the second support 15 may remain worn on the thigh irrespective of the gait of the user. Thus, even when the thigh rotates based on the medial rotation/lateral rotation axis X3 in the second support 15, user inconvenience and resistance may be reduced (or, alternatively, minimized). The rotation assembly 12 of the motion assistance apparatus 1 may be located on an upper portion of a hip so as to allow the user to sit down without interference of the rotation assembly 12.

Figure 8:
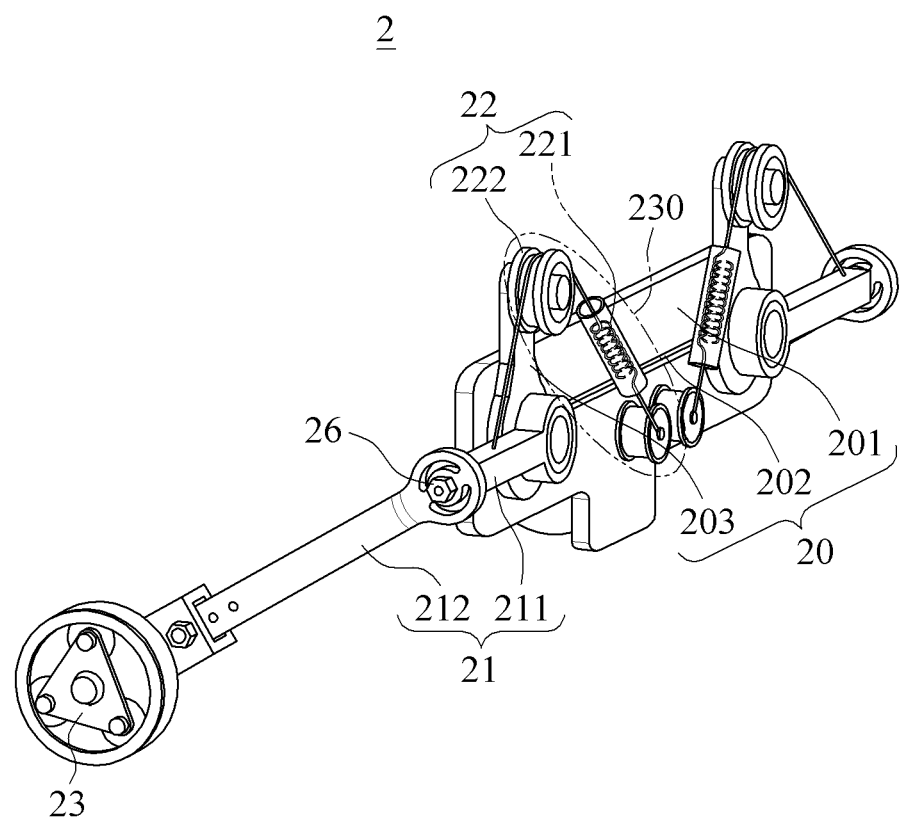
FIG. 8 is a perspective view illustrating an example of a motion assistance apparatus.
Figure 9:
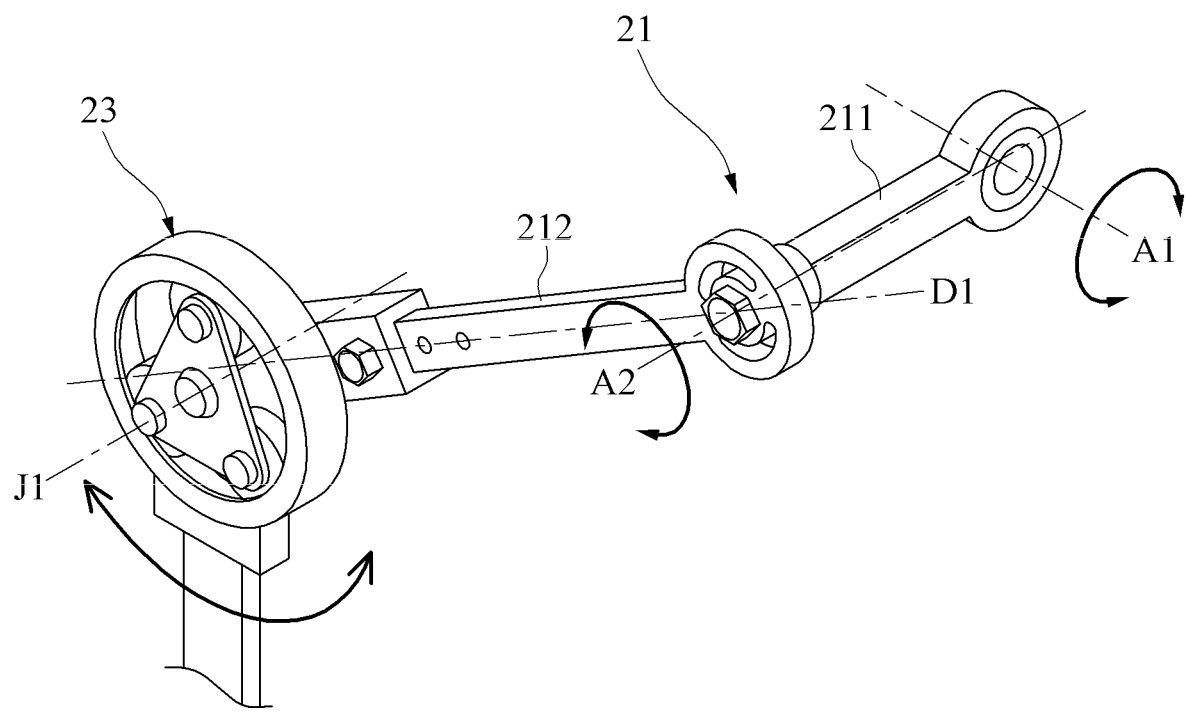
FIG. 9 illustrates an example of a rotary link and a side link.

FIG. 8 is a perspective view illustrating an example of a motion assistance apparatus and FIG. 9 illustrates an example of a rotary link and a side link.

Referring to FIGS. 8 and 9, a motion assistance apparatus 2 may include a first support 20, a side frame 21, a stopper 26, a rotation assembly 22, and a joint assembly 23. Further, as discussed in detail below with reference to FIG. 11, the motion assistance apparatus 2 may further include a force transmitter 24, and a second support 25.

The side frame 21 may rotate relative to the first support 20. The side frame 21 may include a rotary link 211 and a side link 212 connected to the rotary link 211 and located on a lateral side of a user.

The rotary link 211 may be connected to the first support 20 to be rotatable based on the first rotational axis A1. The rotary link 211 may be connected to, for example, a base plate 201 such that the first rotational axis A1 passes through the first support 20. The rotary link 211 may be connected such that a location of the rotary link 211 is adjustable relative to the first support 20. For example, the rotary link 211 may be connected to a guide member 203 and slide along a guide rail 202 formed in a horizontal direction of the base plate 201. The rotary link 211 may extend vertically to the first rotational axis A1.

The side link 212 may be rotatably connected to the rotary link 211 and configured to cover at least a portion of a lateral side of the user. A rotational axis of the side link 212 relative to the rotary link 211, a second rotational axis A2 may be on a plane perpendicular to the first rotational axis A1. The second rotational axis A2 may match a longitudinal direction of the rotary link 211. For example, the second rotational axis A2 may be vertical to the first rotational axis A1. A longitudinal direction D1 of the side link 212 may be vertical to the first rotational axis A1. For example, the longitudinal direction of the side link 212 may be vertical to the longitudinal direction of the rotary link 211.

The stopper 26 may set a rotation angle of the side link 212 relative to the rotary link 211. As illustrated in FIG. 8, the stopper 26 may be, for example, a fixing screw configured to connect the rotary link 211 and the side link 212. The stopper 26 may also be a quick release (QR) lever located to the second rotational axis A2 of the side link 212 with respect to the rotary link 211. In this example, the rotation angle of the side link 212 relative to the rotary link 211 may be set by selectively opening or closing the QR lever.

A location of the joint assembly 23 may be adjusted in the longitudinal direction D1 of the side link 212. The joint assembly 23 may include a connecting member configured to slide in the longitudinal direction of the side link 212 and a fixing member configured to a set a location of the connecting member. The side link 212 may include a plurality of holes spaced apart from one another in the longitudinal direction. The location of the joint assembly 23 relative to the side link 212 may be set by inserting a fixing screw into a hole corresponding to the location of the connecting member.

The rotation assembly 22 may include a passive actuator configured to passively provide a torque to the rotary link 211 using a potential energy. The passive actuator may include an elastic body 221 and a fixed pulley 222.

The elastic body 221 may store an elastic potential energy based on a movement of the hip joint, thereby providing a power to the rotary link 211 based on a restoring force. The elastic body 221 may connect the first support 20 and the rotary link 211 of the side frame 21. When the rotary link 211 rotates in one direction, the elastic body 221 may store an elastic energy while being compressed or tensioned. Also, the elastic body 221 may transmit an energy obtained during a restoration to a normal state, the rotary link 211 via a power transmitting member. Through this, the elastic body 221 may rotate the rotary link 211 in a reverse direction. The fixed pulley 222 may form a moving route of the power transmitting member.

The fixed pulley 222 may be attached to one side of the guide member 203. One end of the elastic body 221 may be connected to the rotary link 211 of the side frame 21. Another end of the elastic body 221 may be connected to the base plate 201 of the first support 20. In this example, an initial length of the elastic body 221 may increase according to an increase in distance between the guide member 203 and a center of the base plate 201, and thus, an elastic force provided to the rotary link 211 may also increase. When a user with a large waist wears the motion assistance apparatus 2, a greater elastic force may be provided as compared to when a user with a small waist wears the motion assistance apparatus 2.

The rotation assembly 22 may further include an elastic force adjuster to adjust the elastic force of the elastic body 221. The elastic force adjuster may adjust the elastic force by, for example, changing a connecting point between the elastic body 221 and the base plate 201.

One end of the elastic body 221 may be connected to the rotary link 211 of the side frame 21, and another end of the elastic body 221 may be connected to the guide member 203 of the first support 20. In this example, irrespective of the position of the guide member 203, an elastic force constantly increasing or decreasing based on the rotation angle of the rotary link 211 may be provided.

As the foregoing example, the rotation assembly 22 may be an active-type actuator using a motor. Depending on examples, the rotation assembly 22 may not be provided in the motion assistance apparatus 2. The motion assistance apparatus 2 may operate in response to the adduction/abduction motion of the user irrespective of a presence of the rotation assembly 22 and thus, a user wearability may be enhanced.

Figure 10:
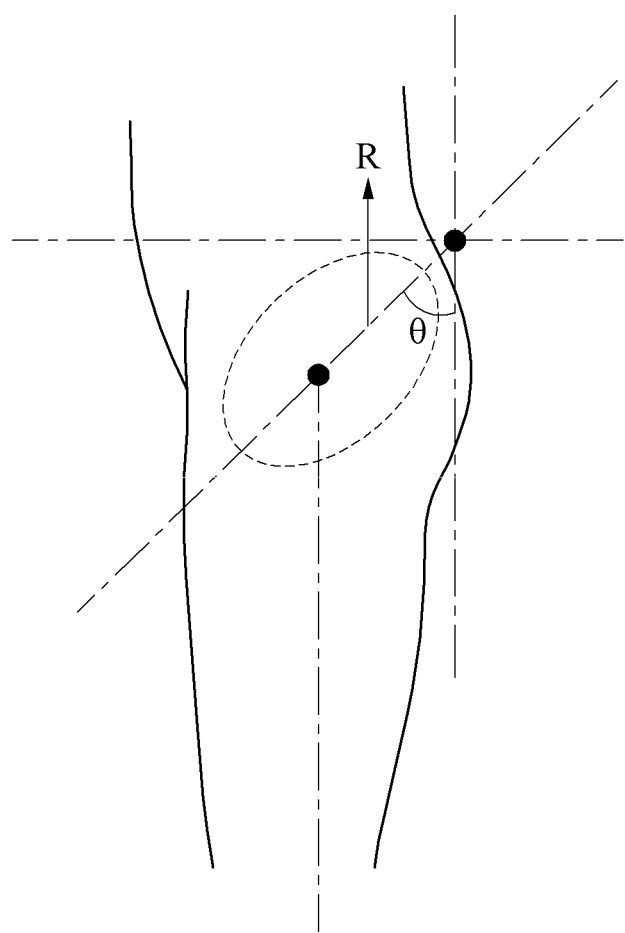
FIG. 10 illustrates an example of a hip joint position distribution based on a body of a user.
Figure 11:
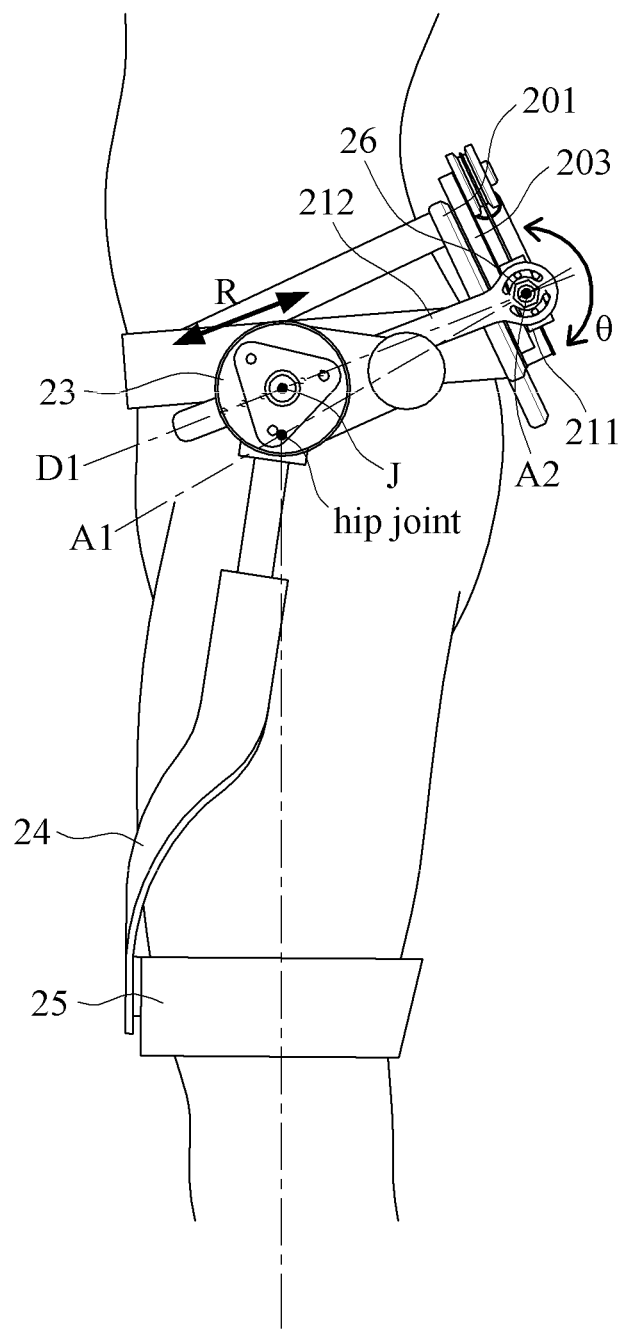
FIG. 11 illustrates an example of adjusting a location of a joint rotation axis.

FIG. 10 illustrates an example of a hip joint position distribution based on a body of a user and FIG. 11 illustrates an example of adjusting a location of a joint rotation axis.

Referring to FIGS. 10 and 11, the joint rotation axis J may be adjusted to pass through the hip joint of the user. In an example of FIG. 10, the joint rotation axis J may be adjusted based on a polar coordinate system. When the second rotational axis A2 of the side link 212 is an origin, a straight-line distance between the second rotational axis A2 and the joint rotation axis J may be understood as a distance ingredient of the polar coordinate system, and a rotation angle of the joint rotation axis J based on the second rotational axis A2 may be understood as an angle ingredient of the polar coordinate system. A location of the joint rotation axis J may be adjusted by adjusting a location of the joint assembly 23 on the side link 212 and a rotation angle of the side link 212 relative to the rotary link 211.

The side link 212 may be adjusted to pass through the hip joint of the user by rotating the side link 212 relative to the rotary link 211 when viewed from a side of the user. For example, the side link 212 may rotate at an angle corresponding to a rotation angle of the extension/flexion axis X2 based on the second rotational axis A2 so as to match angle ingredients of the joint rotation axis J and the extension/flexion axis X2 on the polar coordinate system. In this example, the stopper 26 may be used to set the angle between the side link 212 and the second rotational axis A2.

The joint assembly 23 may move relative to the side link 212 such that the joint rotation axis J is adjusted to pass through the hip joint of the user. For example, the joint assembly 23 may move by a straight-line distance between the second rotational axis A2 and the extension/flexion axis X2 so as to match distance ingredients of the joint rotation axis J and the extension/flexion axis X2 on the polar coordinate system. In this example, a fixing member may be used to set the location of the joint assembly 23 on the side link 212.

In FIGS. 10 and 11, the angle ingredients of the joint rotation axis J and the extension/flexion axis X2 are matched and then the distance ingredients are matched. Depending on examples, the distance ingredients may be matched and then the angle ingredients may be matched.

Figure 12:
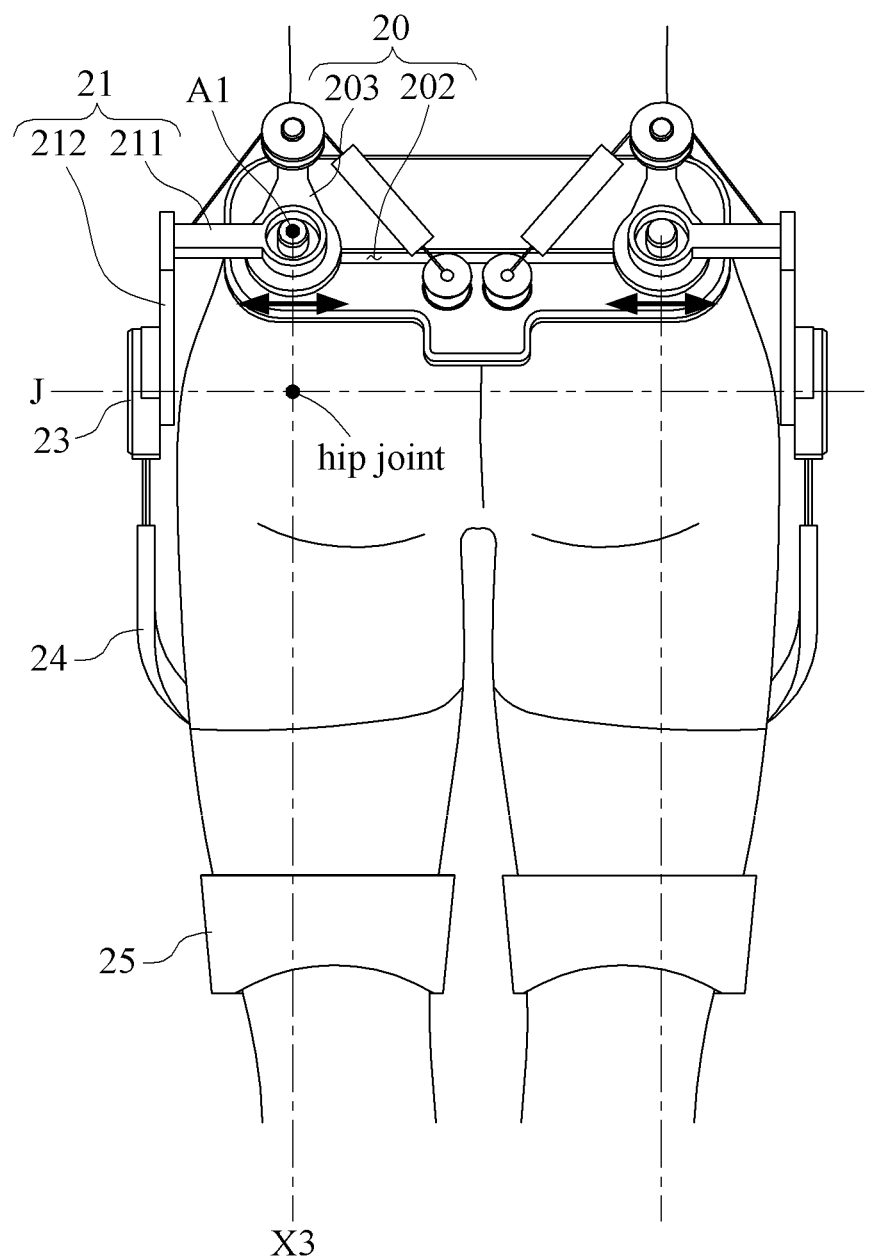
FIG. 12 illustrates an example of adjusting a location of a first rotational axis.

FIG. 12 illustrates an example of adjusting a location of a first rotational axis.

Referring to FIG. 12, a location of the first rotational axis A1 may be adjusted relative to the first support 20. For example, the rotary link 211 may slide in a horizontal direction of a user with respect to the first support 10. The first rotational axis A1 may slide in a direction parallel to the joint rotation axis J. The first rotational axis A1 may be adjusted to pass through a hip joint of the user irrespective of a body size of the user.

As described with reference to FIGS. 10 through 12, the joint rotation axis J and the first rotational axis A1 may be adjusted to have a single intersection point while passing through the hip joint of the user. Through this, a motion assistance apparatus may make motions similar to an extension/flexion motion and an adduction/abduction motion of the hip joint. Accordingly, the motion assistance apparatus may be less likely to be (or, alternatively, prevented from being) twisted due to non-matched axes and a user wearability may be improved.

Figure 13:
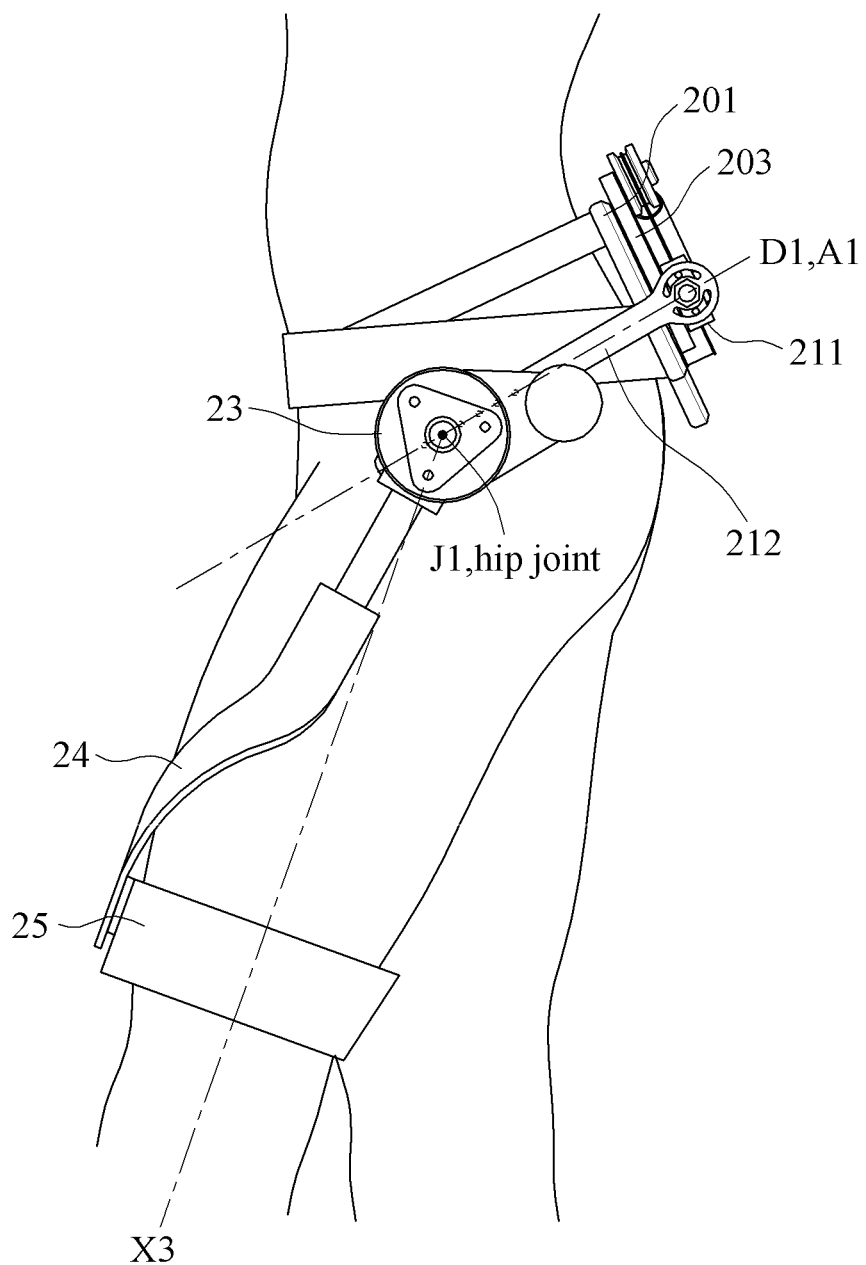
FIG. 13 is a side view illustrating an example of a motion assistance apparatus assisting a gait of a user.
Figure 14:
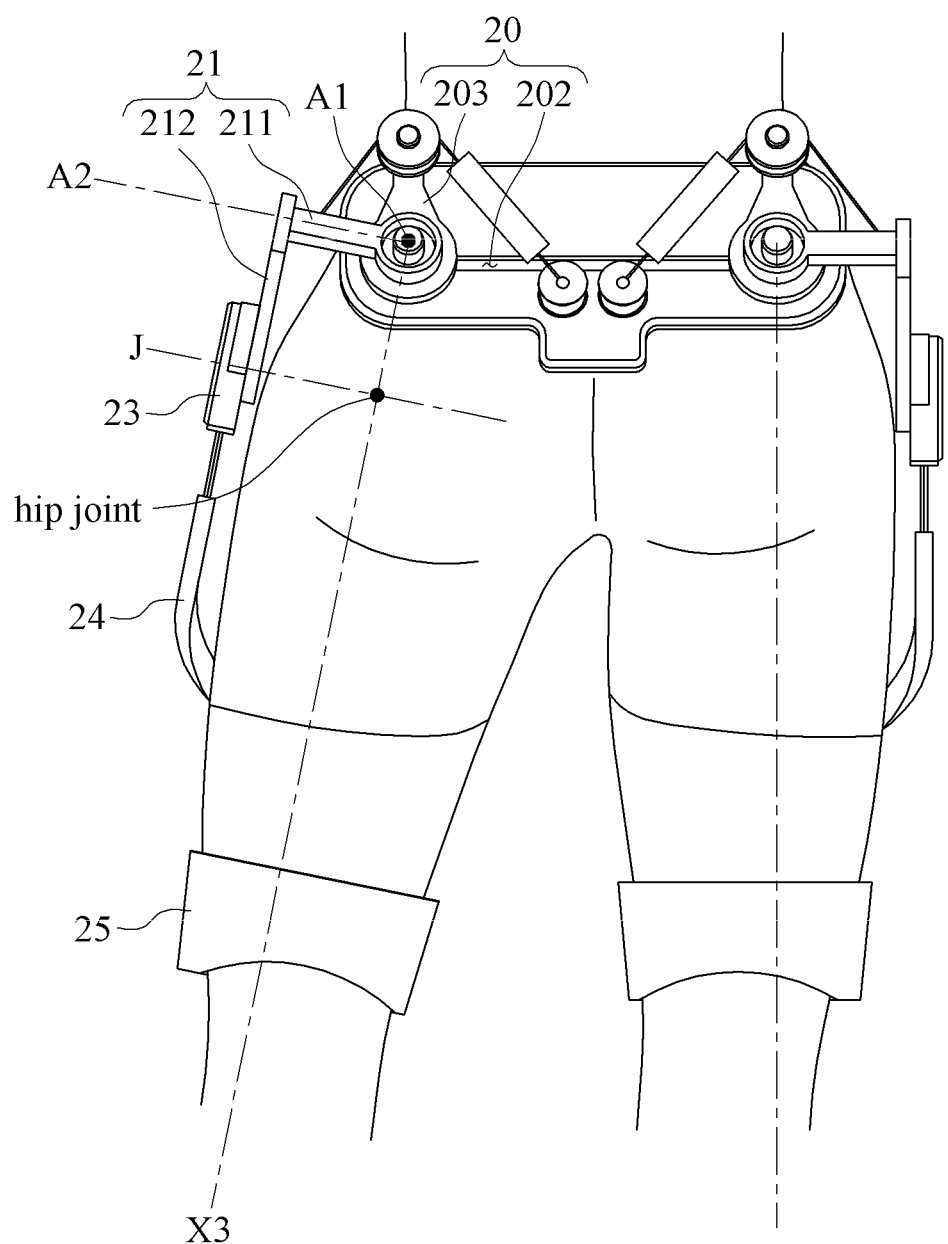
FIG. 14 is a rear view illustrating an example of a motion assistance apparatus assisting a gait of a user.

FIG. 13 is a side view illustrating an example of a motion assistance apparatus assisting a gait of a user and FIG. 14 is a rear view illustrating an example of a motion assistance apparatus assisting a gait of a user.

Referring to FIGS. 13 and 14, when the joint rotation axis J and the first rotational axis A1 are adjusted to pass through a hip joint of the user, the motion assistance apparatus 2 may efficiently assist a motion of the hip joint. An angle of the second rotational axis A2 may vary based on an angle of the first rotational axis A1. An angle of the joint rotation axis J may vary based on the angle of the first rotational axis A1 and the angle of the second rotational axis A2. Since the first rotational axis A1 and the joint rotation axis J pass through the hip joint of the user, the motion assistance apparatus 2 may be allowed to assist a circumduction motion in which a change in at least two rotational axes of the hip joint occurs. In an example of FIG. 13, when the joint rotation axis J passes through the hip joint of the user, the joint assembly 23 may rotate at an angle the same as a rotation angle of the extension/flexion motion of the hip joint. Likewise, in an example of FIG. 14, when the first rotational axis A1 passes through the hip joint of the user, the rotary link 211 may rotate at an angle the same as a rotation angle of the adduction/abduction motion of the hip joint. Through this, consumption of a torque provided from the joint assembly 23 and the rotation assembly 22 to the hip joint may be reduced (or, alternatively, minimized) and the motion assistance apparatus 2 may operate similarly to a gait motion of the user, which may enhance a wearability of the user. Also, the joint rotation axis J and the first rotational axis A1 may intersect the medial rotation/lateral rotation axis X3 at the hip joint of the user so as to allow the hip joint to make the medial rotation/lateral rotation motion without restrictions.

Figure 15:
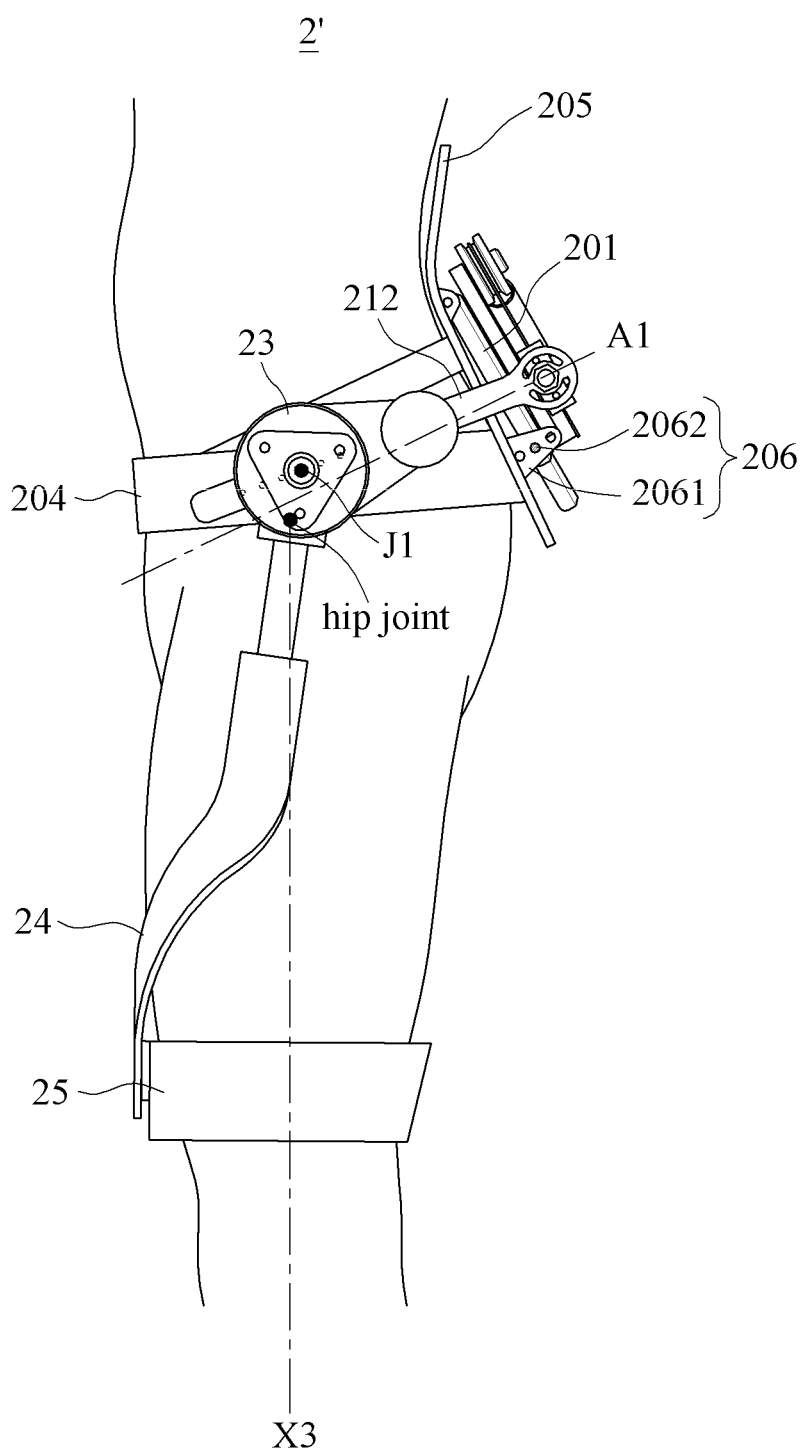
FIGS. 15 and 16 illustrate examples of adjusting a gradient of a first rotational axis in a motion assistance apparatus.
Figure 16:
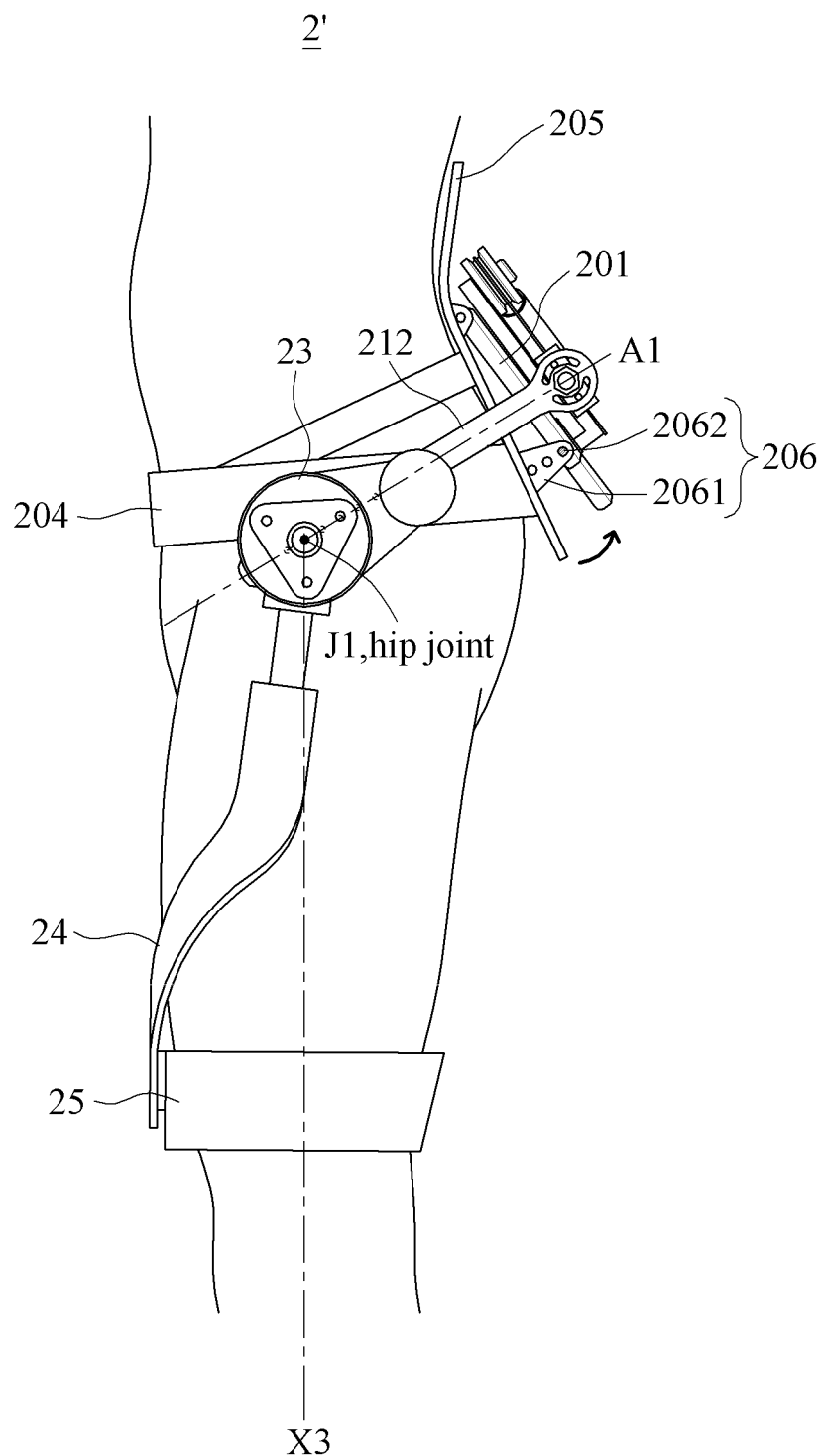

FIGS. 15 and 16 illustrate examples of adjusting a gradient of the first rotational axis A1 in a motion assistance apparatus.

Referring to FIGS. 15 and 16, a motion assistance apparatus 2' may include the first support 20, the side frame 21, the joint assembly 23, the rotation assembly 22, the force transmitter 24, and the second support 25.

The first support 20 may include a support plate 205, the base plate 201, an angle adjusting member 206, and a wearable member 204.

The support plate 205 may be between the base plate 201 and a first part, for example, a rear side of a waist of a user. The support plate 205 may include a curved surface corresponding to the waist of the user. The support plate 205 may be attached to the first part of the user using the wearable member 204. The base plate 201 may be connected to the support plate 205 so as to be adjustable in angle. For example, an upper portion of the base plate 201 may be hinged to the support plate 205.

The angle adjusting member 206 may allow the base plate 201 to pivot by setting an angle between the base plate 201 and the support plate 205. The angle adjusting member 206 may include a connector 2061 extending from the support plate 205 toward the base plate 201 and a fixer 2062 configured to fix the connector 1061 and the base plate 201.

In the aforementioned structure, an angle between the first rotational axis A1 and the ground may be adjusted by adjusting the angle between the base plate 201 and the support plate 205. Thus, by adjusting the angle between the base plate 201 and the support plate 205, the first rotational axis A1 may be adjusted to pass through the hip joint of the user when viewed from a side of the user.

While FIGS. 15 and 16 illustrate an example in which the angle adjusting member 206 manually adjusts the angle between the base plate 201 and the support plate 205, example embodiments are not limited thereto. For example, the angle adjusting member 206 may include an actuator and an interface, where the actuator electrically adjusts the angle between the base plate 201 and the support plate 205 based on information received via the interface.

In other example embodiments, the motion assistance apparatus 2 may emit a signal (e.g., an infrared light) corresponding to a location of the joint rotation axis J and the first rotation axis A1, and the angle adjusting member 206 may include a sensor configured to sense the signal and automatically adjust the angle between the first rotational axis A1 and the ground such that the first rotational axis A1 passes through the hip joint of the user.

Figure 17:
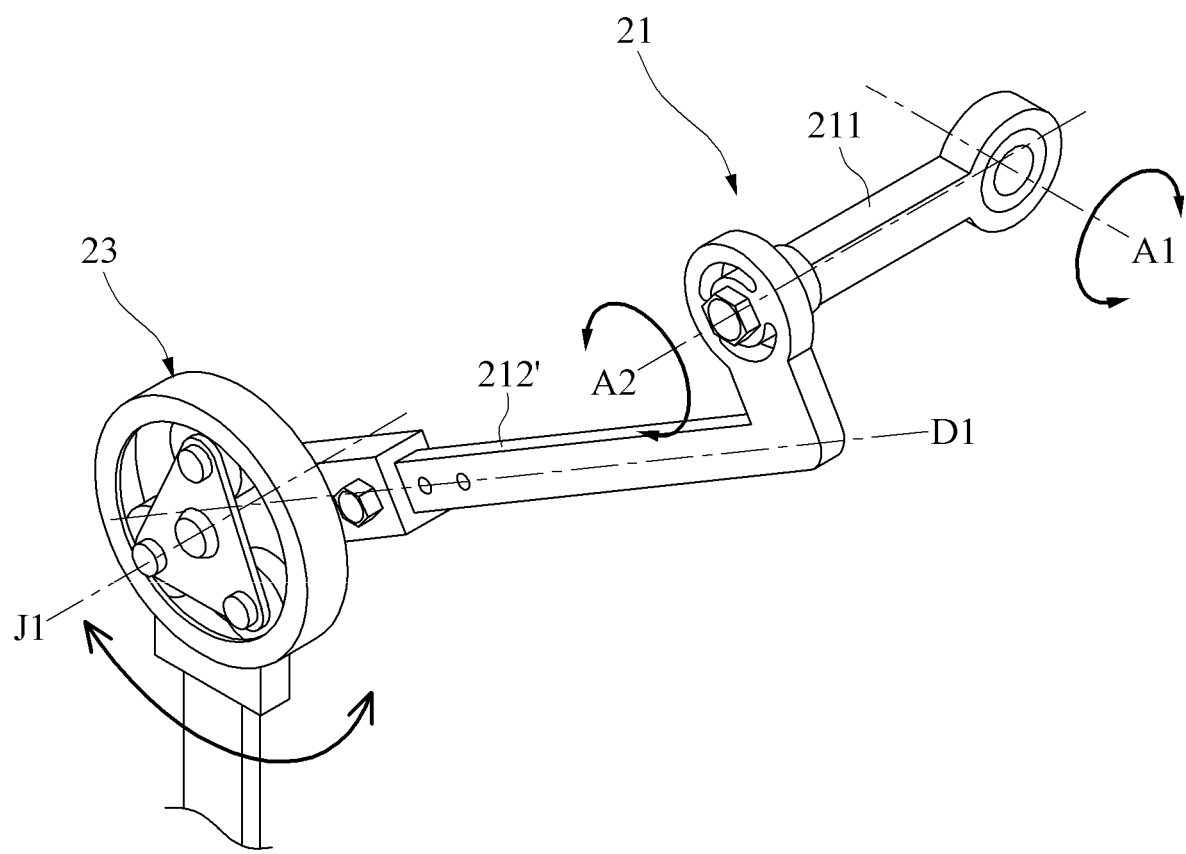
FIGS. 17 and 18 illustrate examples of a side frame.
Figure 18:
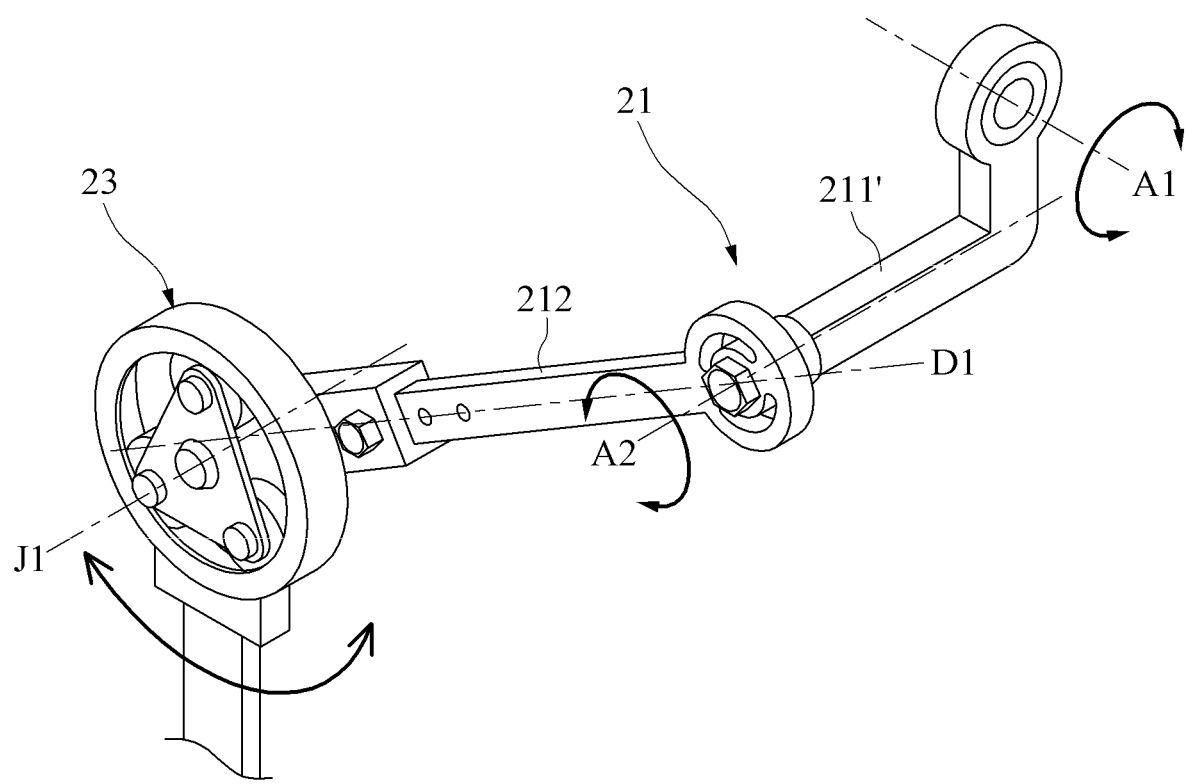

FIGS. 17 and 18 illustrate examples of a side frame.

Referring to FIGS. 17 and 18, a side frame 21 may include rotary links 211 and 211' and side links 212 and 212'. The rotary links 211 and 211' and the side links 212 and 212' may be provided in various forms. For example, at least one of the rotary link 211' and the side link 212' may be provided in a curved form. In this example, the second rotational axis A2 may be on a plane perpendicular to the first rotational axis A1, and the joint rotation axis J may be parallel with the second rotation axis A2. For example, an axial direction of the joint rotation axis J may be vertical to an axial direction of the first rotational axis A1 and thus, the joint rotation axis J and the first rotational axis A1 may be adjusted to intersect with each other on a single point.

As such, the rotary links 211 and 211' and the side links 212 and 212' may be provided in various forms based on a body side of a user, a design of a motion assistance apparatus, and the like, for example.

Figure 19:
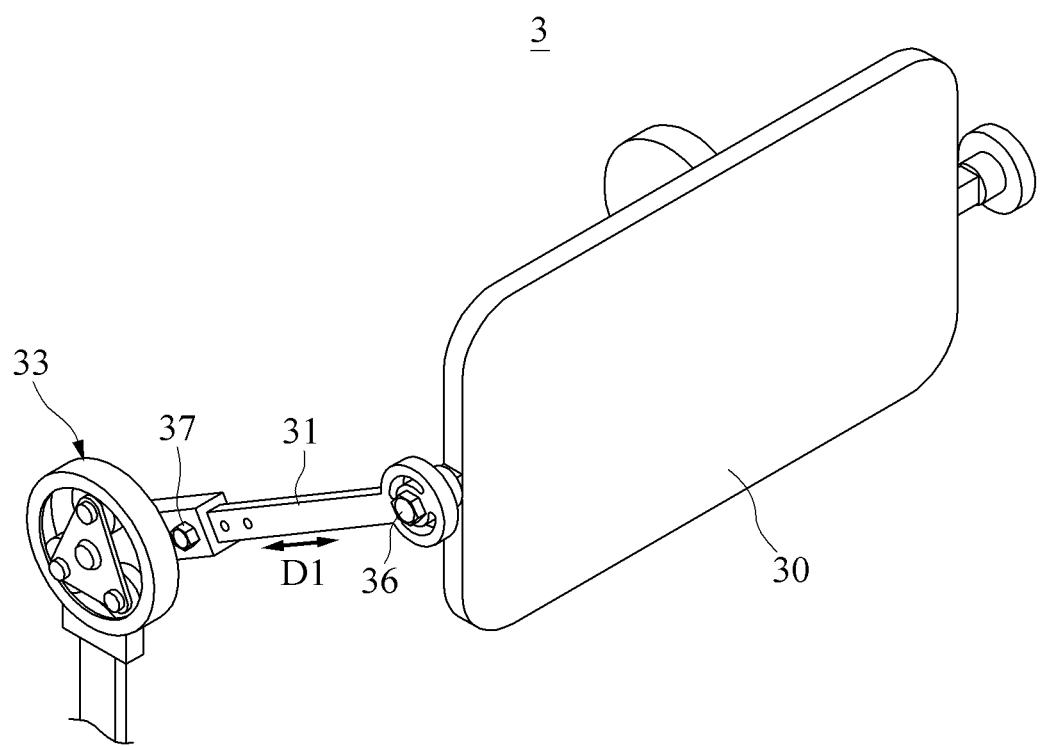
FIG. 19 is a perspective view illustrating an example of a motion assistance apparatus.

FIG. 19 is a perspective view illustrating an example of a motion assistance apparatus.

Referring to FIG. 19, a motion assistance apparatus 3 may include a first support 30, a side frame rotatable relative to the first support 30, a stopper 36 configured to set an angle between the side frame 31 and the first support 30, a joint assembly 33 configured to slide relative to the side frame 31, and a fixing member 37 configured to set a location of the joint assembly on the side frame 31.

The side frame 31 may rotate based on an axis vertical to a virtual straight line parallel with a sliding direction D1 of the joint assembly 33. As described with reference to FIG. 10, the joint rotation axis J may be adjusted to pass through the hip joint based on a polar coordinate system.

Figure 20:
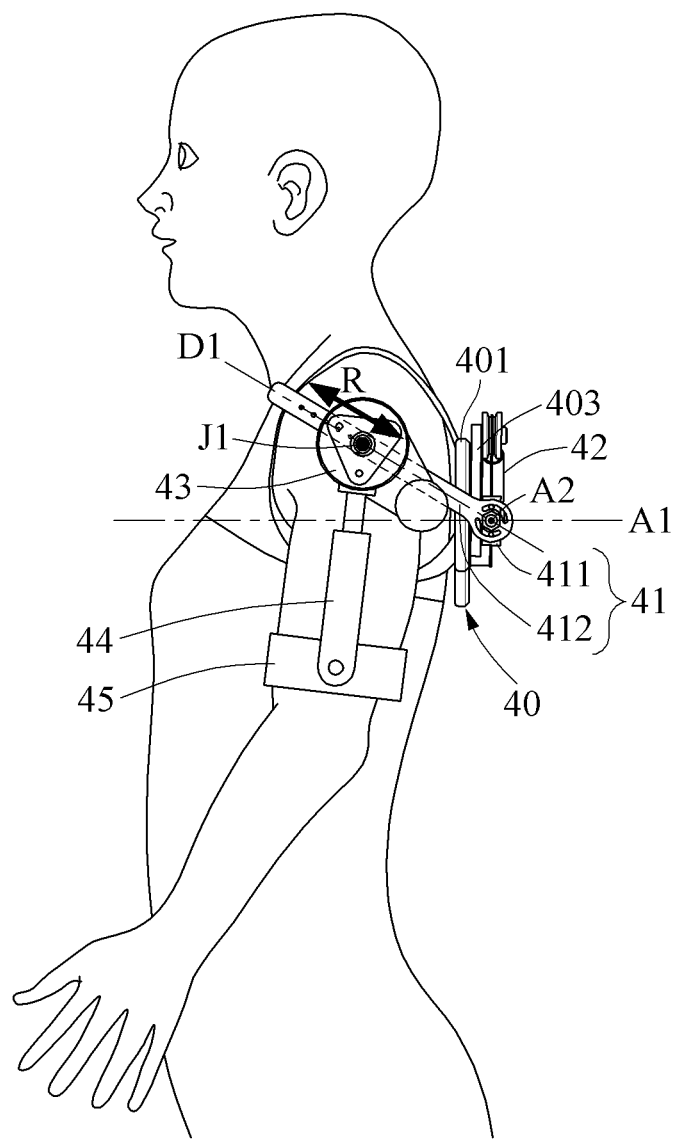
FIG. 20 is a side view illustrating an example of a motion assistance apparatus assisting a shoulder joint of a user.

FIG. 20 is a side view illustrating an example of a motion assistance apparatus assisting a shoulder joint of a user.

Referring to FIG. 20, a motion assistance apparatus 4 may include a first support 40, a side frame 41, a joint assembly 43, a rotation assembly 42, a force transmitter 44, and a second support 45.

The first support 40 may be located on a proximal part based on a shoulder joint of a user, for example, on a back of the user. The side frame 41 may be provided to cover at least a portion of a lateral side of the user, for example, a shoulder.

The side frame 41 may include a rotary link 411 connected to the first support 40 to be rotatable based on the first rotational axis A1 and a side link 412 connected to the rotary link to be rotatable based on the second rotational axis A2.

The second support 45 may be connected to the joint assembly 43 through the force transmitter 44, and configured to support a distal part based on the shoulder joint of the user, for example, an upper arm.

In this example, the first rotational axis A1 and the joint rotation axis J1 may be adjusted to pass through the shoulder joint of the user. Through this, the motion assistance apparatus 4 may assist an adduction/abduction motion and an extension/flexion motion of the shoulder joint of the user.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A motion assistance apparatus comprising:
   a first support configured to support a waist of a user;
   a side frame connected to the first support, the side frame configured to cover at least a portion of a side of the waist, the side frame including,
      a rotary link connected to the first support, the rotary link configured to rotate based on a first rotational axis that passes through the first support,
      a side link connected to the rotary link, the side link configured to rotate based on a second rotational axis located on a plane perpendicular to the first rotational axis and offset from the first rotational axis by a length of the rotary link such that the side link is perpendicular to the rotary link and does not rotate about the first rotational axis, and
      a stopper configured to selectively stop the side link from rotating about the second rotational axis, the stopper being a fixing screw connecting the side link and the rotary link, the fixing screw configured to selectively increase a frictional force between the side link and the rotary link to fix a rotation angle of the side link relative to the rotary link; and
   a joint assembly connected to the side frame, the joint assembly configured to slide along the side frame such that, as the joint assembly slides rearward along the side frame in a sliding direction determined by the fixed position of the side link relative to the rotary link, the joint assembly ascends to locate the joint assembly at a part of a hip joint of the user, the joint assembly configured to rotate based on a joint rotation axis parallel to the second rotational axis.

2. The motion assistance apparatus of claim 1, wherein an angle of ascension of the joint assembly is in a range between 50 degrees (°) and 70°.

3. The motion assistance apparatus of claim 1, wherein the side frame is configured to rotate relative to the first support based on the first rotational axis vertical to a virtual straight line, the virtual straight line being parallel with the joint rotation axis of the joint assembly.

4. The motion assistance apparatus of claim 3, wherein the motion assistance apparatus is configured to adjust the joint rotation axis by sliding the joint assembly on the side frame such that an intersection point of the joint rotation axis and the first rotational axis is positioned at the hip joint when the user is in an upright state.

5. The motion assistance apparatus of claim 3, wherein the motion assistance apparatus is configured to adjust the first rotational axis such that the first rotational axis intersects with a straight line vertically connecting the hip joint and a ground when the user is in an upright state.

6. The motion assistance apparatus of claim 3, wherein the side frame is configured to slide in a horizontal direction of the user relative to the first support to adjust the first rotational axis.

7. The motion assistance apparatus of claim 3, wherein the first support includes:

a support plate configured to support a rear side of the waist of the user; and a base plate connected to the side frame, the base plate configured to pivot with respect to the support plate to adjust the first rotational axis.

8. The motion assistance apparatus of claim 1, further comprising:

a rotation assembly configured to rotate the side frame relative to the first support, wherein the rotation assembly includes an actuator configured to provide a rotational power to rotate the side frame relative to the first support, the actuator being one of a motor and an elastic body.

9. The motion assistance apparatus of claim 8, wherein the actuator is the elastic body having a first end a second end, the first end of the elastic body being connected to the side frame and the second end of the elastic body being connected to the first support.

10. A motion assistance apparatus comprising:

a first support configured to support a first part of a user;

a side frame configured to cover at least a portion of a side of the user, the side frame including, a rotary link connected to the first support, the rotary link configured to rotate based on a first rotational axis that passes through the first support, a side link connected to the rotary link, the side link configured to rotate about based on a second rotational axis located on a plane perpendicular to the first rotational axis and offset from the first rotational axis by a length of the rotary link such that the side link is perpendicular to the rotary link and does not rotate about the first rotational axis, and a stopper configured to selectively stop the side link from rotating about the second rotational axis by exerting pressure to increase a frictional force between the side link and the rotary link to fix a rotation angle of the side link relative to the rotary link; and a joint assembly connected to the side frame, the joint assembly configured to adjust a location of the joint assembly in a longitudinal direction of the side frame by sliding along the side frame such that, as the joint assembly slides rearward along the side frame in a sliding direction determined by the fixed position of the side link relative to the rotary link, the joint assembly ascends, the joint assembly configured to rotate based on a joint rotation axis parallel to the second rotational axis.

11. The motion assistance apparatus of claim 10, wherein the motion assistance apparatus is configured to adjust an angle of ascension of the joint assembly.

12. The motion assistance apparatus of claim 10, wherein the side frame is configured to rotate based on an axis vertical to a virtual straight line, the virtual straight line being parallel with the sliding direction of the joint assembly.

13. The motion assistance apparatus of claim 10, wherein the side frame is slidably connected to the first support to adjust a location of the side frame relative to the first support.

14. The motion assistance apparatus of claim 13, wherein the first support includes:

a base plate configured to support the first part of the user;

a guide rail provided on the base plate; and a guide member configured to connect to the side frame, and to slide along the guide rail to adjust the location of the side frame relative to the first support.

15. The motion assistance apparatus of claim 14, wherein the first support further comprises:

a support plate between the first part of the user and the base plate, and the base plate is connected to the support plate, the base plate configured to pivot with respect to the support plate to adjust an angle between the base plate and the support plate.

16. The motion assistance apparatus of claim 10, wherein the motion assistance apparatus further comprises:

a second support configured to support a second part of the user; and a force transmitter configured to connect the joint assembly and the second support, the motion assistance apparatus is configured to adjust the joint rotation axis and the first rotational axis such that an intersection point of the first rotational axis and the joint rotation axis is at a joint connecting the first part of the user and the second part of the user.

* * * * *